United States Patent
Joo et al.

(10) Patent No.: US 11,926,259 B1
(45) Date of Patent: Mar. 12, 2024

(54) ALERT MODALITY SELECTION FOR ALERTING A DRIVER

(71) Applicant: Arriver Software LLC, Novi, MI (US)

(72) Inventors: Nicholas Frank Joo, Rochester Hills, MI (US); Rachel Gray Alexander, Chicago, IL (US); Shabin Mahadevan, Lake Orion, MI (US)

(73) Assignee: Arriver Software LLC, Novi, MI (US)

( * ) Notice: Subject to any disclaimer, the term of this patent is extended or adjusted under 35 U.S.C. 154(b) by 0 days.

(21) Appl. No.: 18/158,903

(22) Filed: Jan. 24, 2023

(51) Int. Cl.
 *G08B 21/00* (2006.01)
 *B60Q 9/00* (2006.01)
 *G08G 1/0967* (2006.01)

(52) U.S. Cl.
 CPC ............ *B60Q 9/00* (2013.01); *G08G 1/0967* (2013.01)

(58) Field of Classification Search
 USPC .... 340/425.5, 903, 924, 929, 943, 952, 967, 340/969, 994, 427, 441, 457, 460, 474, 340/488, 466, 515, 517
 See application file for complete search history.

(56) References Cited

U.S. PATENT DOCUMENTS

| | | | | |
|---|---|---|---|---|
| 10,196,071 | B1 * | 2/2019 | Rowson | G09B 19/167 |
| 2016/0063761 | A1 * | 3/2016 | Sisbot | G06T 19/006 |
| | | | | 345/633 |
| 2017/0355377 | A1 * | 12/2017 | Vijaya Kumar | B60W 50/0098 |
| 2019/0213429 | A1 * | 7/2019 | Sicconi | G06F 3/012 |
| 2020/0062275 | A1 * | 2/2020 | Higgins | G05D 1/0061 |
| 2020/0239007 | A1 * | 7/2020 | Sobhany | B60W 50/14 |
| 2021/0237645 | A1 * | 8/2021 | Farrell | B60W 50/16 |

FOREIGN PATENT DOCUMENTS

DE 102020204964 A1 10/2021

\* cited by examiner

*Primary Examiner* — Daniel Previl
(74) *Attorney, Agent, or Firm* — The Marbury Law Group, PLLC

(57) ABSTRACT

Embodiments include systems and methods that may include receiving situational information triggering a need to alert the driver and in response to the need to alert the driver presenting an alert to the driver based on driver state information selected based on a likelihood the driver will be more receptive to the alert modality than others of the plurality of alert modalities. The likelihood the driver will be receptive to the alert modality may be based on the received situational information, the received driver state information, and a historical behaviour record. The historical behaviour record may correlate the driver's reaction or the reaction of other drivers to previous alerts presented to the driver or other drivers with similar driver state information and similar situational information triggering presentation of previous alerts. The system may learn from the reaction of the driver and/or other drivers to better select suitable alert modalities.

30 Claims, 9 Drawing Sheets

ALERT MODALITY SELECTION FOR ALERTING A DRIVER

BACKGROUND

Driver inattention is one of the largest causes of automotive accidents; according to the National Highway Traffic and Safety Administration in the United States of America, about 3,100 lives are taken each year due to accidents involving driver inattention. Multiple studies have shown that when automation of driving increases, driver attention levels decrease. This inverse relationship means that there needs to be stronger and improved methods of alerting drivers in vehicles enabled with an advanced driver assistance system (ADAS).

SUMMARY

Various aspects include methods that may be implemented on a processor of a vehicle and systems for implementing the methods for selecting an alert modality for alerting a driver of a vehicle. The methods may include receiving, by a processor of the vehicle, situational information triggering a need to alert the driver, in which the situational information may include a location and surroundings of the vehicle; and in response to the need to alert the driver based on the received situational information: receiving, by the processor from driver monitoring sensors, driver state information indicative of a level of engagement with the operation of the vehicle by the driver; and presenting an alert to the driver using an alert modality selected from a plurality of alert modalities, in which the alert modality is selected based on a likelihood the driver will be more receptive to the alert modality than others of the plurality of alert modalities, in which the likelihood the driver will be receptive to the alert modality is based on the received situational information, the received driver state information, and a historical behavior record of the driver, in which the historical behavior record correlates the driver's reaction to a previous alert presented using one of the plurality of alert modalities with similar driver state information and similar situational information triggering presentation of the previous alert.

Some aspects may further include receiving, by the processor from the driver monitoring sensors, information regarding a reaction of the driver to the presented alert; and updating the historical behavior record of the driver based on the driver's reaction to the selected alert modality of the presented alert, the received driver state information, and the received situational information triggering the need to alert the driver. In some aspects, the information regarding the reaction of the driver to the presented alert may include a facial expression of the driver obtained when or just after the alert is presented. In some aspects, the information regarding the reaction of the driver to the presented alert may include a response time of the driver reacting to the presented alert. In some aspects, the information regarding the reaction of the driver to the presented alert may include information evaluating whether the driver operated the vehicle within acceptable parameters.

In some aspects, the historical behavior record may correlate the driver's reaction to the previous alert as one in which the driver exhibited a negative emotional state in response to the alert modality used for the previous alert. In some aspects, the historical behavior record may correlate the driver's reaction to the previous alert as one in which the driver operating the vehicle outside acceptable parameters in response to the alert modality of the previous alert.

In some aspects, the selected alert modality used for the presented alert may over-ride a user preference of alert modalities. In some aspects, the likelihood the driver will be receptive to the alert modality may be further based on feedback from reactions of other drivers to at least one of similar situational information or similar other-driver state information.

Further aspects include a vehicle system including a memory and a processor configured to perform operations of any of the methods summarized above. Further aspects may include a vehicle system having various means for performing functions corresponding to any of the methods summarized above. Further aspects may include a non-transitory processor-readable storage medium having stored thereon processor-executable instructions configured to cause a processor of a vehicle system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
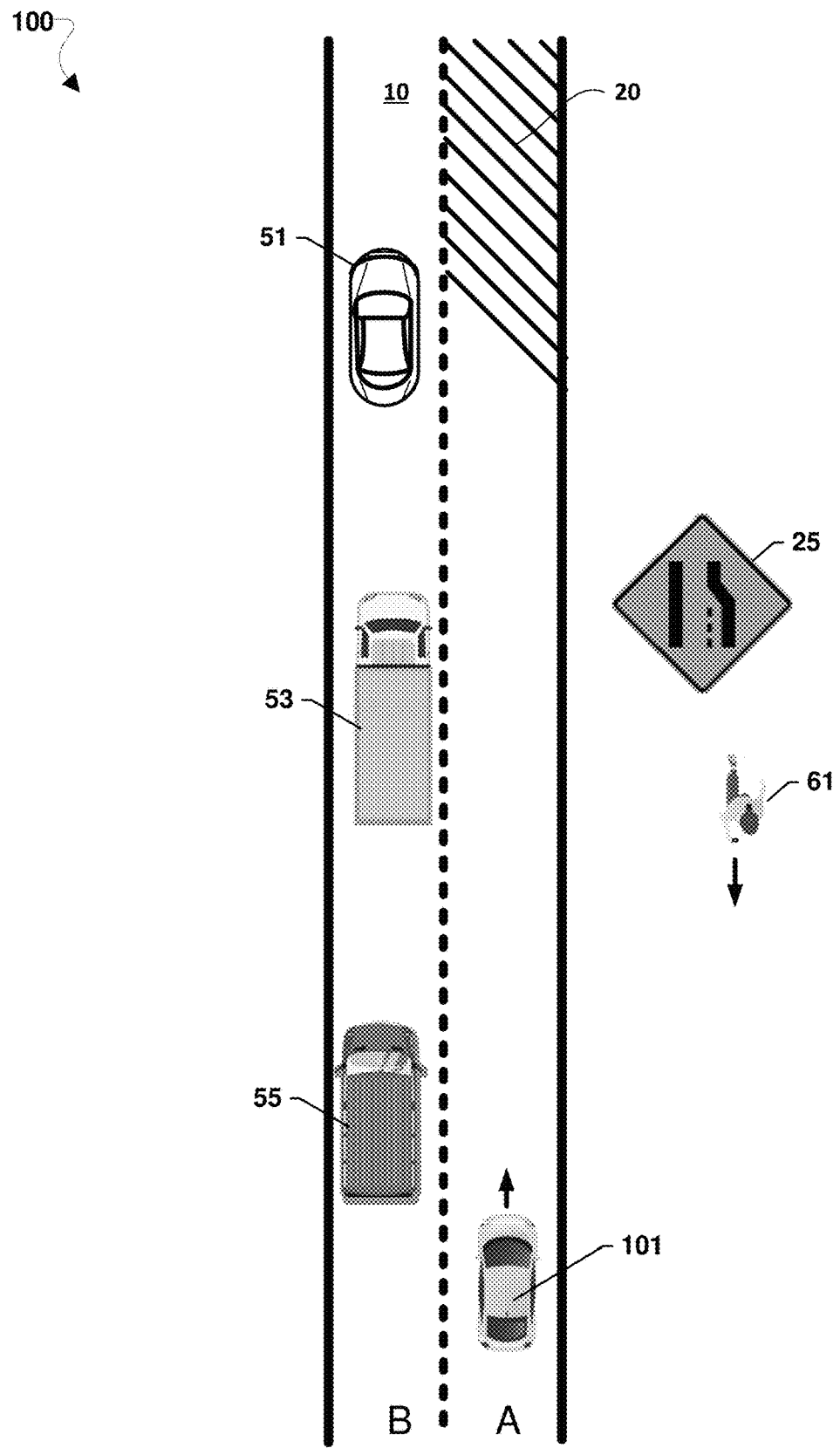
FIGS. 1A-1D are schematic diagrams illustrating an example environment suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods and vehicle systems for providing alerts to drivers using an alert modality that has been determined to be effective for the particular driver under the particular circumstances requiring the alert. In various embodiments, a vehicle computing device, such as an ADAS, may receive situational information and from that information determine that there is a need to alert the driver. The situational information may include information detailing a location and information regarding the surroundings of the vehicle, such as other vehicles, roadway contours and markings, pedestrians, and objects. In response to determining that a need exists to alert the driver based on the received situational information, the vehicle computing device may obtain or receive driver state information (e.g., from sensors that can image or otherwise sense information about the driver), and from that information determine a level of engagement of the driver with the operation of the vehicle. In addition to the driver's attention on the road and operating the vehicle, the level of engagement of the driver may include aspects of the driver's emotional state. Based on this information and the condition requiring or trigger the alert, the vehicle computing device may select from a plurality of alert modalities a particular alert modality (e.g., sound, display, vibrations, and combinations thereof) to which the driver is likely to be receptive under the circumstances. The selected alert may then be presented to the driver.

The vehicle computing device, such as an ADAS, may continue to monitor the driver to assess an emotional reaction as well driving reaction to the alert, and use that post-alert driver state information to update a database of driver reactions to alert modalities correlated to situations requiring an alert and driver state information. By recording such driver reactions to the alert under the circumstances triggering the alert, the computing device may develop a historical behavior record of the driver's responsiveness to different alert modalities under various circumstances. This database may be used by the computing device to assess the likelihood of the driver being receptive to various alert modalities under various circumstances triggering an alert and driver states. In this manner, the vehicle computing device may learn over time to select alert modalities to which the driver will react positively under various circumstances, thereby improving the effectiveness of the vehicle's driver alert processes.

As used herein the term "alert modality," refers to one or more devices or systems configured to inform a driver or an occupant of a vehicle of a condition. Alert modalities may include an audible or auditory alert, which includes an alert that is communicated through sound, such as a beeping noise or a spoken warning. Audible alerts may be used to alert the driver to a potential collision, a lane departure, other hazards on the road, or conditions that demand the driver's attention. Audible alerts may be communicated through spoken messages, either through a human voice or a synthesized voice. Spoken alerts may be used to provide the driver with additional information or instructions, such as a warning to slow down or change lanes. Alert modalities may include visual alerts, such as flashing lights or warning symbols on a dashboard display. Visual alerts may also include a message, symbol, or other indication on a display. Visual alerts may be used, for example, to alert the driver to a low tire pressure, a malfunctioning system, or other issues demanding the driver's attention. Alert modalities may further include a haptic element (i.e., physical sensations), such as vibrations induced in the steering wheel, a seat, a driver's wearable smart-device, or other similar devices. Haptic alerts may be used to alert the driver to a potential collision or a lane departure, or other issues demanding the driver's attention.

As used herein the term "situational information," refers to any data or information that is relevant to the current location, position, or circumstances of the vehicle. This can include information about the vehicle's surroundings, such as the weather, traffic conditions, road conditions, and any obstacles or hazards that the vehicle may encounter. Situational information can also include information about the vehicle, such as vehicle heading, speed, fuel level, tire pressure, and any mechanical or technical issues that may be present. Other types of situational information might include the vehicle's destination, its route or path, and any additional instructions or guidance that may be needed to safely operate the vehicle.

As used herein the term "driver state information," refers to any and all data or information that is related to the physical, mental, attention, and emotional state of the driver of a vehicle. This can include information about the driver's level of fatigue, stress, distraction, or impairment, as well as any medical or health issues that may affect their ability to operate the vehicle safely. Driver state information may also include data about the driver's behavior, such as driving habits, response times, and ability to follow traffic laws and regulations. Driver state information may be collected through driver monitoring sensors and other monitoring devices installed in the vehicle, such as cameras, biometric sensors (e.g., on the steering wheel), seat sensors, and the ADAS (which may monitor how the vehicle is being steered and controlled). Driver state information can be used to assess the driver's performance and identify potential risks or concerns that may need to be addressed in selecting an appropriate alert modality under particular circumstances.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The terms "component," "system," "unit," "module," and the like refer to a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The terms "onboard" or "in-vehicle" are used herein interchangeably to refer to equipment or components contained within, attached to, and/or carried by a vehicle or device that provides a vehicle functionality. Onboard equipment typically includes a processing system that may include one or more processors, SOCs, and/or SIPs, any of which may include one or more components, systems, units, and/or modules that implement the functionality (collectively referred to herein as a "processing system" for conciseness). Aspects of onboard equipment and functionality may be implemented in hardware components, software components, or a combination of hardware and software components.

The term "computing device" is used herein to refer to any of a variety of in-vehicle computer systems that include one or many programmable processors, memory, interfaces to various vehicle components and subsystems, and, in some embodiments, wireless communication systems (e.g., a vehicle-to-vehicle communication system). A vehicle ADAS is an example of a computing device suitable for implementing various embodiments. However, other computing devices separate from, coupled to or subsystems of the ADAS may implement various embodiments. Thus, while some embodiments are described with reference to a vehicle ADAS performing some of the operations, such descriptions are for ease of reference and illustration and not intended to limit the claims to an ADAS implementation unless specifically recited in the claims.

Various embodiments may use vehicle sensors, which may include communication systems, to compile situational information regarding a vehicle's location and its surroundings. An ADAS may use such situational information to determine when there is a need to alert the driver about conditions related to vehicle navigation (e.g., lane changes, hazards, threats, etc.). The vehicle sensors may provide a 360° non-line-of-sight awareness and a higher level of predictability for enhanced road safety and autonomous or semi-autonomous driving.

Some embodiments may use information obtained through a vehicle communication system to obtain situational information and identify conditions requiring alerting the driver. Such communication systems may exchange information through vehicle-to-vehicle (V2V), vehicle-to-infrastructure (V2I), vehicle-to-pedestrian (V2P), and/or vehicle-to-everything (V2X) communication protocols that may provide enhanced communication range and reliability. Additionally, the communication systems may exchange information through vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G NR systems, etc.), etc.

Current V2X applications use maps, vehicle kinematic state, and vehicle's heading/course to compute and identify safety critical events or conditions in identified areas of relevance. Events and conditions outside those areas of relevance may be ignored for purposes of warning (i.e., alerting) the driver. Defining areas of relevance may be useful to reduce the V2X objects tracked and focus computing power and resources on more appropriate safety-relevant data.

Various embodiments include methods and systems configured to perform the methods for selecting an alert modality for alerting a vehicle driver in a manner configured to increase the likelihood that the driver will be more receptive to the alert. In various embodiments, a vehicle computing device (e.g., onboard equipment) may receive situational information including information regarding a V2X-identified threat to the vehicle or a vehicle occupant, as well as other situations that may demand the driver's attention. The received situational information may come from onboard systems, V2X infrastructure, other vehicles, other external systems, etc. The vehicle computing device may evaluate a plurality of factors relevant to determining whether there is a need to alert the driver in response to receiving situational information.

In response to the need to alert the driver based on the received situational information, various embodiments include methods and systems configured to determine drive state information indicative of a level of engagement with the operation of the vehicle by the driver. A driver's level of engagement with the operation of the vehicle may help determine the selected alert modality and may be measured using driver monitoring sensors including in-vehicle sensors (e.g., driver-facing cameras to capture facial expressions and gaze information, steering wheel sensors, seat sensors, microphones, etc.). In particular, vehicle sensors and computing devices may measure direction of eye gaze, expressions, head position, posture, vocalizations, sounds, movement, interaction with a mobile phone or other peripheral computing device, performance in handling the vehicle (e.g., reaction time), as well as other conditions reflecting what is happening inside the vehicle. The vehicle computing device may use such information to make an assessment as to whether the driver is paying attention to the operation of the vehicle, and whether the driver's emotional state may impact the driver's attention or reaction to an alert.

For example, if the driver is looking down or looking anywhere other than through the main windshield, this suggests the driver has a low or possibly medium level of engagement with the operation of the vehicle. Even if the driver is looking straight ahead at the road, but is crying, grimacing or expressing sounds of anger or frustration, this may suggest the driver has a low level of engagement with the operation of the vehicle. Thus, the estimation of the driver's engagement level may reflect the driver's emotional state (e.g., crying, frowning, smiling, laughing, angry, etc.), which may also impact a driver's ability to respond appropriately to an alert and to the conditions triggering the alert.

Additionally, peripheral computing devices linked to the vehicle computing device, like a smart phone or mobile computing device, may be configured to provide the vehicle computing device with information about when the user (i.e., the driver) is using that device, which may suggest the driver is not paying attention to the operation of the vehicle. These types of information may be used by the system to estimate/define the driver's engagement level, which can therefore determine which one or more alert modalities should be used to alert the driver when needed.

The vehicle computing device may determine one or more alert modalities that are both likely to receive the driver's attention and also be received well by the driver (e.g., not startling or annoying the driver) based on the received situational information, the received driver state information, and a historical behavior record of the driver. The selected alert modality may be better suited to alert the driver to various conditions, particularly those that impact navigation and handling of the vehicle.

The vehicle computing device, such as an ADAS, may have a plurality of alert modalities to select from in order to get the driver's attention. For example, the alert modalities may include visual alerts (e.g., lights or displays that may turn on/off or otherwise change state), audible alerts (e.g., sounds generated, interrupted, or otherwise changed), haptic alerts (e.g., vibrations the driver may detect), or a combination thereof. Driver preferences may suggest certain alert modalities are more successful for some drivers, while another driver may feel they are more receptive to a different alert modality. While such driver preferences may be helpful, assessments of driver responses to one or more alert modalities under types of conditions that trigger the need for alerts and types of levels of engagement during those conditions may be helpful in selecting an alert modality to which the driver is more likely to be receptive.

The vehicle computing device, such as an ADAS, may select an alert modality based on an attempt to reduce reaction time for drivers, especially for inattentive drivers and/or in circumstances requiring immediate reactions. Additionally, the vehicle computing device, such as an ADAS, may attempt to increase the attention levels and understanding of the driver using automated features in autonomous or semi-autonomous vehicles. Ultimately, the goal of alerting drivers is to communicate the condition concisely to the driver in a way that is most likely to be effective in prompting the driver to take the appropriate.

External/internal situations may be used to select alert modalities. For example, if the vehicle enters a construction zone, more attention may be needed than while driving on the highway. As another example, if the environment is noisy (e.g., screaming kids in the car, loud music play, construction noise outside, etc.) the volume of the alert may be increased and display and/or haptic modalities may be selected. The vehicle computing device, such as an ADAS, may learn from the driver as well as use real-time data, such as driving scenario and in-cabin data, to select and produce alerts using a particular alert modality or a customized combinations of alert modalities that will satisfy the driver's preferences without compromising safety.

The vehicle computing device may then generate a relevant alert and render the alert on the determined alert modality in a manner that improves the likelihood that the driver both sees and processes the alert message efficiently. Further, the relevant alert may be presented only in the selected one or more alert modalities, avoiding repeating the warning or warning on multiple unnecessary alert modalities. Presenting alerts in a manner that is best received and appreciated by a driver may not only increase safety but also make the driver's interaction with the vehicle's ADAS a more pleasant experience.

Various embodiments may include a vehicle computing device, such as an ADAS, that is configured to select an alert modality by considering a historical behavior record of the driver. Some embodiments may include methods of monitoring the driver's response to a given alert under particular circumstances and using the driver's response as feedback for improving the effectiveness of alerts in the future. By monitoring how the driver responds, including how the driver operates the vehicle following the alert and emotions expressed by the driver responding to the alert, the vehicle computing device can update the historical behavior record for that driver, providing information for selecting an appropriate alert modality in the future.

Various embodiments may improve the safety and effectiveness of vehicle safety systems presenting useful alerts to the driver using one or more of a plurality of alert modalities. In particular, various embodiments may select and present an alert to the driver using one or more particular alert modalities based on a likelihood the driver will be more receptive to the selected one or more alert modalities over others, which may improve the safety and effectiveness of vehicle safety systems by increasing the likelihood that drivers will perceive and react to threat warnings.

FIGS. 1A-1D are schematic diagrams illustrating an example environment 100 suitable for implementing various embodiments. With reference to FIGS. 1A-1D, vehicles 51, 53, 55, 57, 101 are shown traveling on a roadway 10 that includes two lanes A, B. A subject vehicle 101 is used as an exemplary autonomous or semi-autonomous vehicle with a driver inside that may need to be alerted to various conditions. The other vehicles 51, 53, 55, 57 are included to demonstrate an example of a typical traffic pattern the subject vehicle 101 may encounter. FIGS. 1A-1D represent a progression in time, as the vehicles 51, 53, 55, 57, 101 travel along the roadway 10. As shown, the right lane A is ending, as denoted by the hash-lines 20 on the roadway 10, which means the subject vehicle 101 will soon need to merge into the left lane B. A road sign 25 is included on the side of the roadway 10, which is intended to warn drivers that a lane is ending. Additionally, a pedestrian 61 is shown by the side of the roadway 10, which may exemplify one or more external elements that may distract a driver. FIGS. 1A-D are provided for exemplary purposes and may not be to scale.

The environment 100 illustrated in FIGS. 1A-1D reflects a circumstance in which a computing device of the subject vehicle 101 (e.g., part of the ADAS), may receive situational information reflecting the fact that the right lane A is ending. This circumstance, which requires the driver's attention, response, and/or the need to alert the driver is provided as just an example circumstance. Numerous other circumstances may arise necessitating the need to alert the driver. The computing device may receive such situational information from vehicle sensors, map data, V2X systems, and the like. In response to the computing device determining that a need exists to alert the driver based on the received situational information, the computing device may use driver monitoring sensors (e.g., in-vehicle sensors) to access, monitor, or otherwise receive driver state information indicative of a level of engagement by the driver with operation of the vehicle. Such driver state information may be useful to determine which alert modality to use for alerting the driver of the need to change lanes. In addition to alerting the driver using one or more select alert modalities, the computing device may be configured to also receive information regarding a reaction of the driver to the presented alert. The received reaction information may be useful to update a historical behavior record (e.g., a database) used for selecting future alert modalities under similar conditions.

FIG. 1A illustrates a first point in time in the environment 100 in which the computing device of the subject vehicle 101 has received situational information triggering a need to alert the driver of the subject vehicle 101.

Figure 1B:
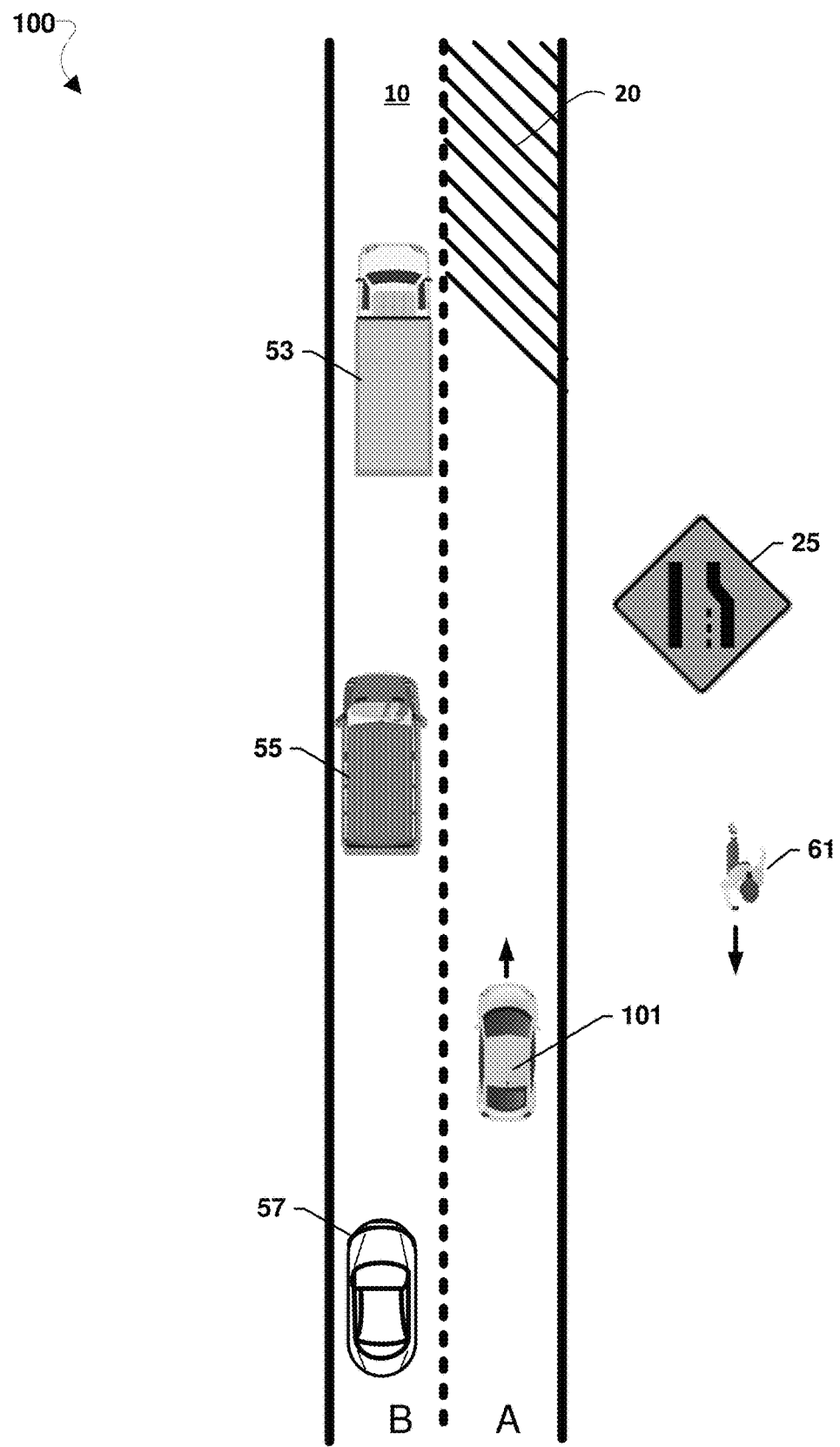

FIG. 1B illustrates a second point in time in the environment 100 in which the computing device has received driver state information indicative of a level of engagement by the driver with operation of the vehicle and has presented an alert to the driver using an alert modality selected from a plurality of alert modalities.

Figure 1C:
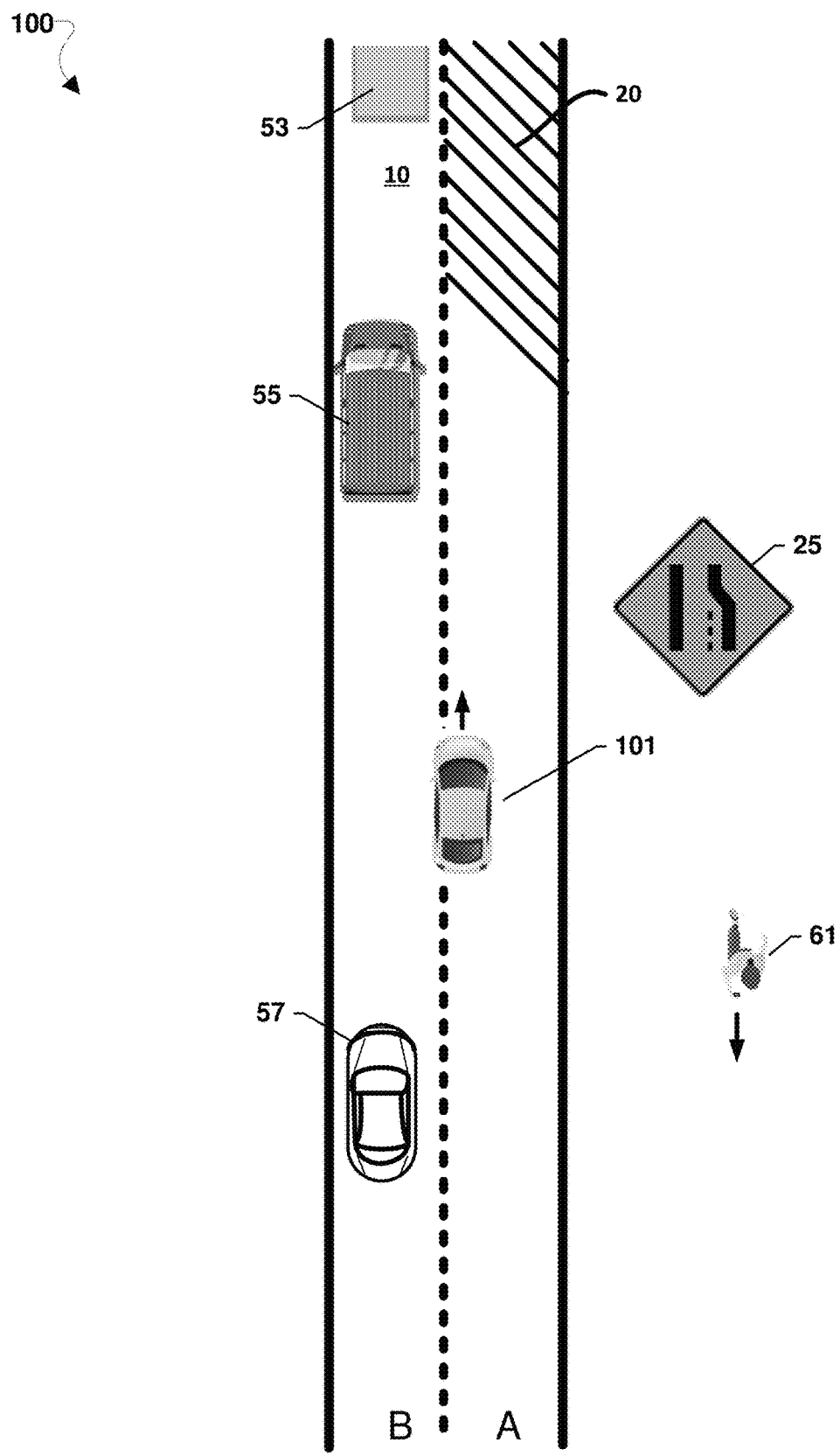

FIG. 1C illustrates a third point in time in the environment 100 in which the driver slowed down the subject vehicle 101 and began a lane change into the left lane B.

Figure 1D:
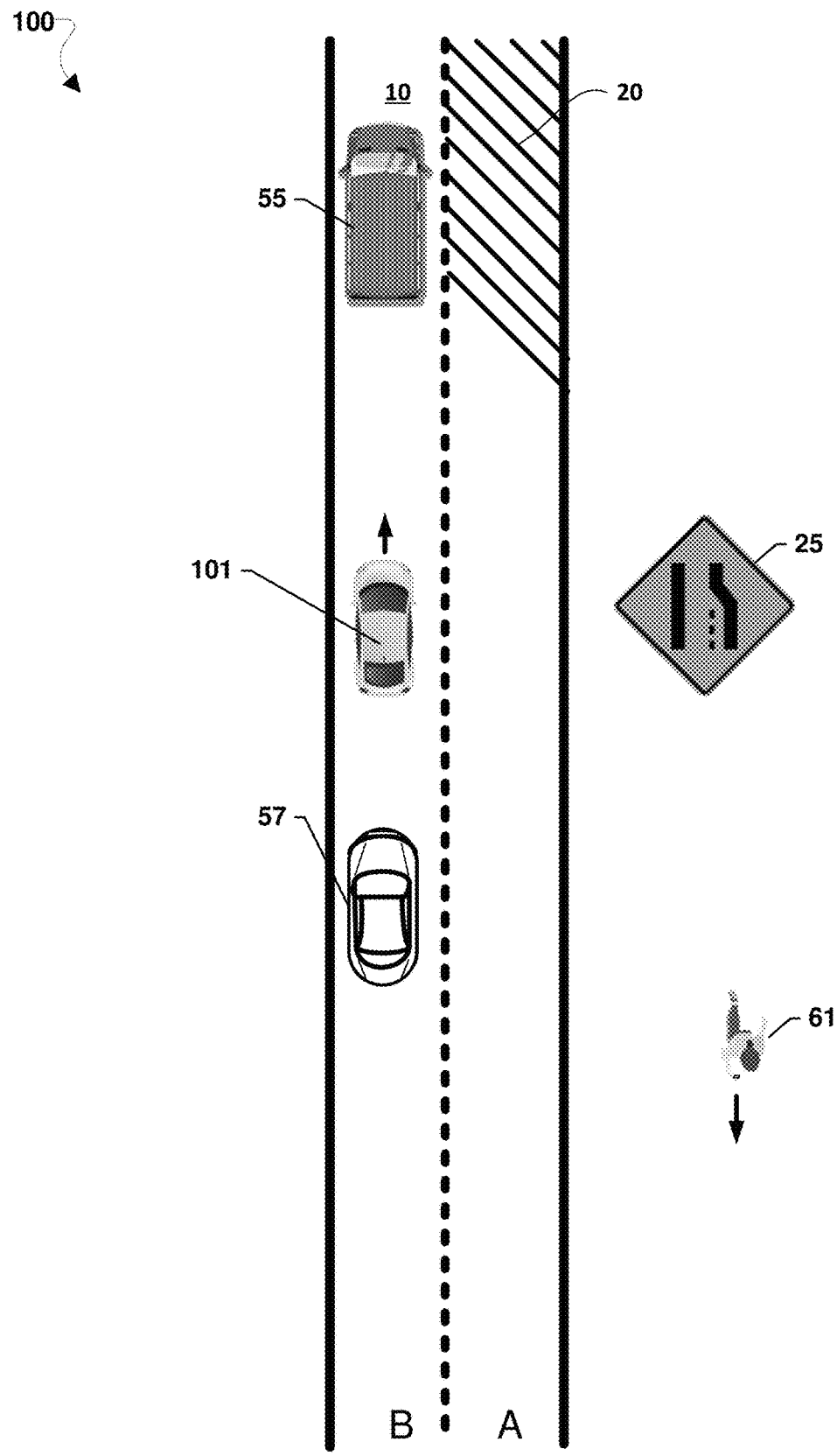

FIG. 1D illustrates a fourth point in time in the environment 100 in which the computing device has received information regarding a reaction of the driver to the presented alert. In particular, the received information may reflect that the driver completed the lane change into the left lane B, which was performed in a timely and safe manner.

Scenario 1—Lane Change/Low Engagement/Negative Reaction

The following is an example of a first scenario (i.e., scenario 1) that elicits a negative reaction from a driver during lane change conditions and a period of low driver engagement, which demonstrates an implementation of methods, devices, and systems in accordance with various embodiments. In scenario 1, a driver is operating the subject vehicle (e.g., 101) on the roadway (e.g., 10) described above with regard to FIGS. 1A-1D. A computing device of the subject vehicle may receive situational information that indicates the subject vehicle must merge left immediately. Such situational information may include map information that identifies a location of the vehicle on the roadway. In addition, the situational information may provide information about the surroundings of the vehicle, such as the approaching first lane (e.g., A) ending, the traffic (e.g., vehicles 51, 53, 55, 57) in the adjacent second lane (e.g., B), a nearby road sign (e.g., 25), or even potential distractions or dangers like the pedestrian (e.g., 61). Such situational information may trigger a need to alert the driver.

In response to the need to alert the driver based on the received situational information, the computing device of the subject vehicle may use one or more driver monitoring sensors (e.g., in-vehicle sensors) to acquire driver state information indicative of a level of engagement with the operation of the vehicle by the driver. In the first scenario the driver may not be paying attention to the road (e.g., looking at and using an in-vehicle infotainment system), which is considered a low level of engagement with the operation of the vehicle by the driver.

In response to receiving the driver state information, the computing device may then determine an alert modality to use to alert the driver. Preferably, the driver is more likely to be receptive to the selected alert modality than any other alert modality. In this case, the computing device may access a historical behavior record (i.e., a database, lookup table(s), etc.), which correlates the driver's reaction to a previous alert presented using one or more of the available alert modalities with similar driver state information and similar situational information triggering the presentation of the previous alert. In scenario 1, the similar driver state information may have involved the driver paying little or no attention to the navigation of the vehicle; the similar situational information may have involved a needed to change lanes; and the previous alert used may have included the default alert modality, which was a combination notification that included a light flashing on the dashboard (i.e., a visual alert) and a buzzer sounding within the vehicle cabin (i.e., an audible alert). The historical behavior record may indicate that under those circumstances (i.e., similar situational information and similar driver state information) the alert modality used had a mixed response from the driver (e.g., the driver reaction was appropriate, but he was frowning and looked upset) but may still be given the highest probability of receiving a positive reaction from the driver is the default combination of visual and audible alert modalities. Thus, in this instance the computing device may select the default alert modality, namely the combination of the light flashing on the dashboard and the buzzer sound.

In response to the presentation of the alert to the driver using the selected alert modalities, in scenario 1, the computing device may receive information regarding a reaction of the driver to the presented alert. In scenario 1, the reaction of the driver demonstrates that the driver was very startled by the alert (e.g., the driver jumped in his seat and had a panicked expression on his face with eyes darting around quickly). Consequently, in scenario 1, the computing device may update the historical behavior record to reflect that the driver reacted negatively to the alert modalities used in this circumstance. Such a negative reaction by the driver may change the weighting in the historical behavior record to discourage or at least reduce the likelihood of using one or both of the selected alert modalities for similar situations and similar driver level of engagement in the future. Thus, in the future, the computing device may select, for example, a haptic alert modality in order to potentially avoid the negative reaction by the driver. Data may be gathered from repeated observations of the driver's reactions to alert modalities in order to build a profile over time that more accurately reflects the alert modalities to which the driver tends to be more receptive.

Scenario 2—Lane Change/Low Engagement/Positive Reaction

The following is an example of a second scenario (i.e., scenario 2) that elicits a positive reaction from a driver during lane change conditions and a period of low driver engagement, which demonstrates an implementation of methods, devices, and systems in accordance with various embodiments. In scenario 2, the circumstances are the same as in scenario 1, described above, but in contrast the reaction by the driver may be a positive reaction. Thus, scenario 2 includes the same situational information received by the computing device, which triggers a need to alert the driver. In addition, in scenario 2, in response to the need to alert the driver based on the received situational information (i.e., lane ending), the computing device may use one or more driver monitoring sensors (e.g., in-vehicle sensors) to acquire the driver state information, which may be the same as that described above with regard to scenario 1 (i.e., a low level of engagement with the operation of the vehicle by the driver). The computing device may then access the historical behavior record, which correlates the driver's reaction to a previous alert presented using one or more of the available alert modalities (e.g., the alert modalities used for the alert in scenario 1—a visual and audible alert) with similar driver state information and similar situational information triggering the presentation of that previous alert. However, since the historical behavior record reflects that the driver previously had a negative reaction to using a visual and audible alert combination, the computing device may select one or more other alert modalities that may have a higher likelihood of success. Thus, in scenario 2, the computing device may use a different alert modality or set of alert modalities from that used in scenario 1, namely a combination of the dashboard lights flashing (i.e., a visual alert) and a vibration of the steering wheel (i.e., a haptic alert).

The driver's reaction to the presented alert in scenario 2 differs from scenario 1. In scenario 2, the computing device of the vehicle receives information regarding a reaction of the driver to the presented alert, which shows that the driver responded promptly to the alert (i.e., fast response time) and effected the lane change safely (e.g., signaling, no abrupt maneuvers, avoided proximity to adjacent vehicles or hazards, and smoothly performing the lane change). In scenario 2, the computing device may update the historical behavior record to reflect that the driver reacted positively to the alert modality used in this circumstance. Such a positive reaction by the driver may reinforce a weighting in the historical behavior record to encourage use of the selected one or more alert modalities for similar situations and similar driver level of engagement in the future.

Scenario 3—Roadway Change/Low Engagement/Positive Reaction

The following is an example of a third scenario (i.e., scenario 3) that elicits a positive reaction from a driver during roadway change conditions and a period of low driver engagement, which demonstrates an implementation of methods, devices, and systems in accordance with various embodiments. In scenario 3, the driver is operating the subject vehicle (e.g., 101) on the roadway (e.g., 10), but the situational information is different from that of scenarios 1 and 2 described above. In particular, the situational information received by the computing device in scenario 3 reflects input from a navigation system of the vehicle, in a fully autonomous driving mode, that reflects the vehicle will be exiting the roadway at the next highway exit. Highway driving in a fully autonomous mode may involve fewer driver alerts and may often be associated with low levels of driver engagement related to the operation of the vehicle. However, with the vehicle exiting the highway, the driver may need to be alerted.

In response to the need to alert the driver based on the received situational information (i.e., a change from highway driving to city driving), the computing device may use one or more driver monitoring sensors (e.g., in-vehicle sensors) to acquire the driver state information indicative of a level of engagement with the operation of the vehicle by the driver. In the third scenario the driver may be sleeping (i.e., low level of engagement or no engagement) looking at and using an in-vehicle infotainment system), which is considered a low level of engagement with the operation of the vehicle by the driver.

In response to receiving the driver state information, the computing device may then access the historical behavior record to determine an alert modality to use to alert the driver. The historical behavior record may correlate the driver's reaction to a previous alert presented using one or more of the available alert modalities with similar driver state information and similar situational information triggering the presentation of that previous alert. In scenario 3, the similar driver state information may have involved the driver reading a book (i.e., a low level of engagement) and similar situational information may have involved the roadway changing from a two-lane road to a one-lane road passing through a small town. The previous alert used according to the historical behavior record may have included a combination notification that included a vibration of the driver's seat (i.e., a haptic alert) and an alarm clock sound being generated by the on-board music/radio speakers (i.e., an audible alert). The historical behavior record may also indicate that under those circumstances (i.e., similar situational information and similar driver state information) the alert modality used elicited a positive reaction from the driver (e.g., driver immediately woke up and responded appropriately) and thus may have the highest probability of receiving a positive reaction from the driver. Thus, in this instance the computing device may select to use an alert that uses the combination of a haptic and audible alert.

In scenario 3, the computing device of the vehicle receives information regarding a reaction of the driver to the presented alert, which shows that the driver responded promptly to the alert (e.g., driver woke up quickly and appeared attentive) and did not exhibit any negative emotions (e.g., the driver was smiling). In scenario 3, the computing device may update the historical behavior record to reflect that the driver reacted positively to the alert modalities used in this circumstance. Such a positive reaction by the driver may reinforce a weighting in the historical behavior record to encourage use of the selected one or more alert modalities for similar situations and similar driver level of engagement in the future.

Scenario 4—Roadway Change/High Engagement/Negative Reaction

The following is an example of a fourth scenario (i.e., scenario 4) that elicits a negative reaction from a driver during roadway change conditions and a period of high driver engagement, which demonstrates an implementation of methods, devices, and systems in accordance with various embodiments. In scenario 4, the driver is operating the subject vehicle (e.g., 101) on the roadway (e.g., 10) and the situational information is similar to that of scenario 3 described above. In particular, the situational information received by the computing device in scenario 4 reflects input from a navigation system of the vehicle that reflects the vehicle will be exiting the roadway at the next highway exit. The vehicle exiting the highway is a circumstance in which the driver needs to be alerted.

In response to the need to alert the driver based on the received situational information, the computing device may use one or more driver monitoring sensors (e.g., in-vehicle sensors) to acquire the driver state information indicative of a level of engagement with the operation of the vehicle by the driver. In the fourth scenario the driver may be watching the roadway attentively with both hands on the steering wheel (i.e., a high level of engagement), which is considered a high level of engagement with the operation of the vehicle by the driver.

In response to receiving the driver state information, the computing device may then access the historical behavior record to determine an alert modality to use to alert the driver. The historical behavior record may correlate the driver's reaction to a previous alert presented using one or more of the available alert modalities with similar driver state information and similar situational information triggering the presentation of that previous alert. In scenario 4, the similar driver state information may have involved the driver paying attention to the roadway but without both hands on the wheel (i.e., still considered a high level of engagement) and similar situational information may have involved the vehicle approaching an intersection in the roadway. The previous alert used according to the historical behavior record may have included a computer-generated voice announcing, "Alert, roadway change ahead" (i.e., an audible alert). The historical behavior record may also indicate that under those circumstances (i.e., similar situational information and similar driver state information) the alert modality used elicited a positive reaction from the driver (e.g., she maintained a positive demeanor, immediately took control of the vehicle, and maneuvered the vehicle appropriately) and thus may have the highest probability of receiving a positive reaction from the driver. Thus, in this instance the computing device may select to use an alert that uses the same audible alert.

In scenario 4, the computing device of the vehicle receives information regarding a reaction of the driver to the presented alert, which shows that the driver looked very annoyed by the alert (e.g., the driver frowning and shaking his head side-to-side in disgust). Consequently, in scenario 4, the computing device may update the historical behavior record to reflect that the driver reacted negatively to the alert modality used in this circumstance. Such a negative reaction by the driver may change the weighting in the historical behavior record to discourage or at least reduce the likelihood of using the selected alert modality for similar situations and similar driver level of engagement in the future. Thus, in the future, the computing device may select, for example, a haptic alert modality in order to potentially avoid the negative reaction by the driver. Data may be gathered from repeated observations of the driver's reactions to alert modalities in order to build a profile over time that more accurately reflects the alert modalities to which the driver tends to be more receptive.

The scenarios 1-4 described above are provided for exemplary purposes only and are not intended to limit the scope of the claims. Other scenarios are envisioned that may include any combination of situational information, driver state information, and selected one or more alert modalities, including a corresponding driver reaction to the combination.

Figure 2A:
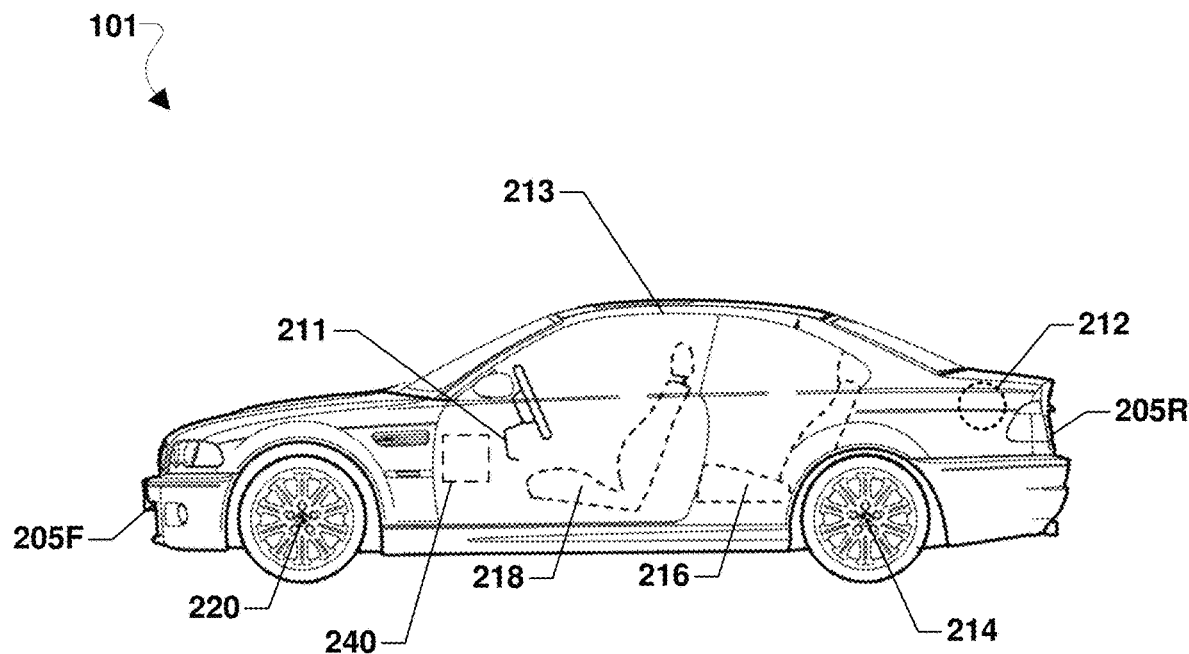
FIGS. 2A and 2B are component block diagrams illustrating a vehicle suitable for implementing various embodiments.
Figure 2B:
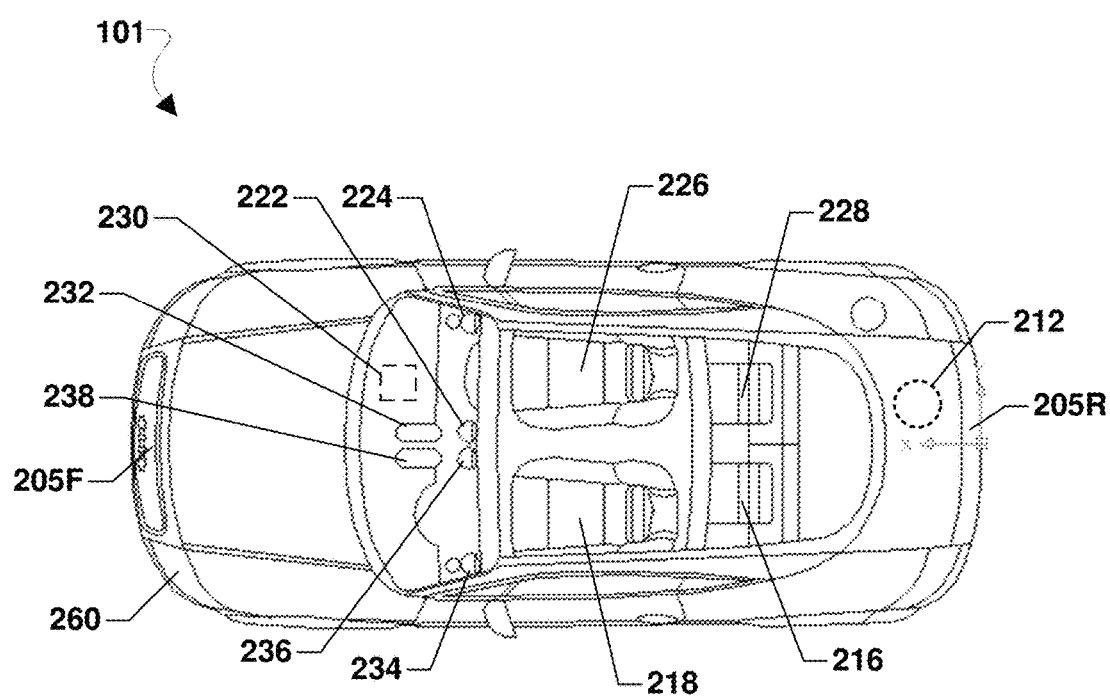

Various embodiments may be implemented within a variety of vehicles, an example vehicle 101 is illustrated in FIGS. 2A and 2B. With reference to FIGS. 1-2B, the vehicle 101 may represent the subject vehicle 101 described above with regard to FIGS. 1A-1D. In various embodiments, the vehicle 101 may include a control unit 240 configured to receive situational information and driver state information, as well as present an alert to the driver using one or more select alert modalities. The control unit 240 may receive the situational and driver state information using on-board communication systems and sensors. In addition, the control unit 240 may control a plurality of alert modalities for alerting a driver to different kinds of conditions under various circumstances.

In various embodiments, the control unit 240, which may include onboard equipment (e.g., 111) and a plurality of sensors 211-238, including satellite geo-positioning system receivers 213, occupancy and in-cabin sensors 212, 216, 218, 226, 228, tire pressure sensors 214, 220, cameras 222, 236, microphones 224, 234, impact sensors 230, radar 232, and lidar 238. The plurality of sensors 211-238, disposed in or on the vehicle, may be used for various purposes, such as autonomous and semi-autonomous navigation and control, crash avoidance, position determination, etc., as well to provide sensor data regarding objects and people in or on the vehicle 101. The sensors 211-238 may include one or more of a wide variety of sensors capable of detecting a variety of information useful for navigation and collision avoidance. Each of the sensors 211-238 may be in wired or wireless communication with a control unit 240, as well as with each other. In particular, the sensors may include one or more cameras 222, 236 or other optical sensors or photo optic sensors. The sensors may further include other types of object detection and ranging sensors, such as radar 232, lidar 238, IR sensors, and ultrasonic sensors. The sensors may further include tire pressure sensors 214, 220, humidity sensors, temperature sensors, satellite geo-positioning system sensors 213, control input sensors 211, accelerometers, vibration sensors, gyroscopes, gravimeters, impact sensors 230, force meters, stress meters, strain sensors, fluid sensors, chemical sensors, gas content analyzers, pH sensors, radiation sensors, Geiger counters, neutron detectors, biological material sensors, microphones 224, 234, occupancy sensors 212, 216, 218, 226, 228, proximity sensors, and other sensors.

The vehicle control unit 240 may be configured to communicate, directing signals from one or both of the narrow-band Wi-Fi emitters 205F, 205R in accordance with various embodiments. Additionally, the control unit 240 may have a default setting for one or both of the narrow-band Wi-Fi emitters 205F, 205R, such as a no-directing setting or a setting that automatically directs one or both of the narrow-band Wi-Fi emitters 205F, 205R to follow the steering wheel. The default setting may be followed when the control unit 240 is not actively directing one or both of the narrow-band Wi-Fi emitters 205F, 205R.

The vehicle control unit 240 may include a computing device that is configured with processor-executable instructions to perform navigation and collision avoidance operations using information received from various sensors, particularly the cameras 222, 236. In some embodiments, the control unit 240 may supplement the processing of camera images using distance and relative position (e.g., relative bearing angle) that may be obtained from radar 232 and/or lidar 238 sensors. The control unit 240 may further be configured to control steering, braking, and speed of the vehicle 101 when operating in an autonomous or semi-autonomous mode using information regarding other vehicles determined using various embodiments.

In various embodiments, the control unit 240 may be configured with processor-executable instructions for making selections of which one or more alert modalities to use for driver alerts, as well as control the presentation of the driver alerts using the selected one or more alert modalities. The plurality of alert modalities may include visual, audible, and/or haptic alert modalities.

The visual alert modalities may include in-vehicle lights or displays, including dashboard displays, infotainment displays, indicators on rear-view or side-view minors, displays incorporated into the windshield and/or other windows, cabin lights, mobile computing devices (e.g., the driver's cellular telephone, tablet, or laptop), wearable computing devices, peripherals, and any other devices configured to generate and/or change a visual perception thereof. Visual alerts may be in the form of a light that turns on, turns off, starts/stops flashing, or changes its state of illumination. Alternatively, the visual alerts may be in the form of a message or other indication presented on a display, the removal of an indication on the display, or a change in the way the indication is displayed.

Vehicles may have large heads-up display capabilities, such as encompassing much if not all of the windshield, as well as multiple displays, such as heads-up displays on side windows and/or multiple different displays on the dashboard. Also, many vehicle infotainment systems have displays that may be used to present an alert. Additionally, a driver's smart phone or other mobile computing device may be linked to the vehicle and used to present an alert. Further, a driver may be wearing a head-mounted display (HMD) providing augmented reality displays of vehicle information overlayed on views of the inside and outside of the vehicle where the driver is looking.

To increase the likelihood that the driver sees and perceives a threat warning message or alert, the vehicle computing device may determine where the driver is looking and identify that a display location that lies within the driver's line of sight on which to present a visible warning about the alert. For example, although a threat like an oncoming vehicle is approaching from the driver's right side, if the driver is currently gazing to the left side of the vehicle, the vehicle computing device may consider this a low level of engagement by the driver that demands a warning message be displayed on a vehicle display location (e.g., a portion of a large display or a display that is located) on the driver's left side. In vehicles equipped with large displays (e.g., a heads up display (HUD) that encompasses the windshield), each display location for presenting an alert may be treated like a different alert modality. In this way, the vehicle computing device may select which one or more of those display portions to use and one or more alert modalities for displaying an alert to the driver (e.g., in the driver's current line of sight. In such vehicles, the vehicle computing device may move the alert message across a large display (i.e., changing alert modalities) as the driver moves his/her eyes and head (i.e., the display location may change in response to driver eye/head movements).

In vehicles equipped with a plurality of displays (e.g., a small HUD, a dashboard display, and side panel displays), the determined display location may be one of the plurality of displays that is most closely aligned with the driver's current line of sight. In such vehicles, the vehicle computing device may move the alert message from one display to another as the driver moves his/her eyes and head (i.e., the display selected to present the alert message may change in response to driver eye/head movements). In some embodiments suitable for vehicles that include a display dedicated to or preferred for displaying certain alerts, determining which of the one or more alert modalities to use may involve selecting the one of a plurality of vehicle displays that is designated as a preferred display for certain threats.

The audible alert modalities may include in-vehicle speakers or noise-making devices, including cabin speakers, added infotainment speakers, turn-signal clickers, speakers in mobile computing devices (e.g., the driver's cellular telephone, tablet, or laptop), and any other devices configured to generate and/or change an audible perception thereof. Audible alerts may be in the form of a sound that turns on, turns off, changes frequency, changes volume, or changes the way in which it is being emitted. For example, audible alerts may interrupt and/or change music or other audio already being emitted by the infotainment system or a passenger smart phone. Alternatively, the audible alerts may be in the form of a voice message or other indication emitted through a speaker, the cessation of the indication from the speaker, or a change in the way the indication is output.

Haptic alert modalities may create an experience of touch by applying forces, vibrations, or motions to the driver. Haptic technologies may be used to control movements or vibrations of machines and devices. For example, haptic alerts may be generated by causing noticeable vibrations, pulses, or other movements in a steering wheel, driver seat, the driver's smart phone, the driver's smart-wearable device (e.g., smart watch, smart glasses, ear bud), or other device configured to generate a haptic alert perceivable by the driver.

Figure 2C:
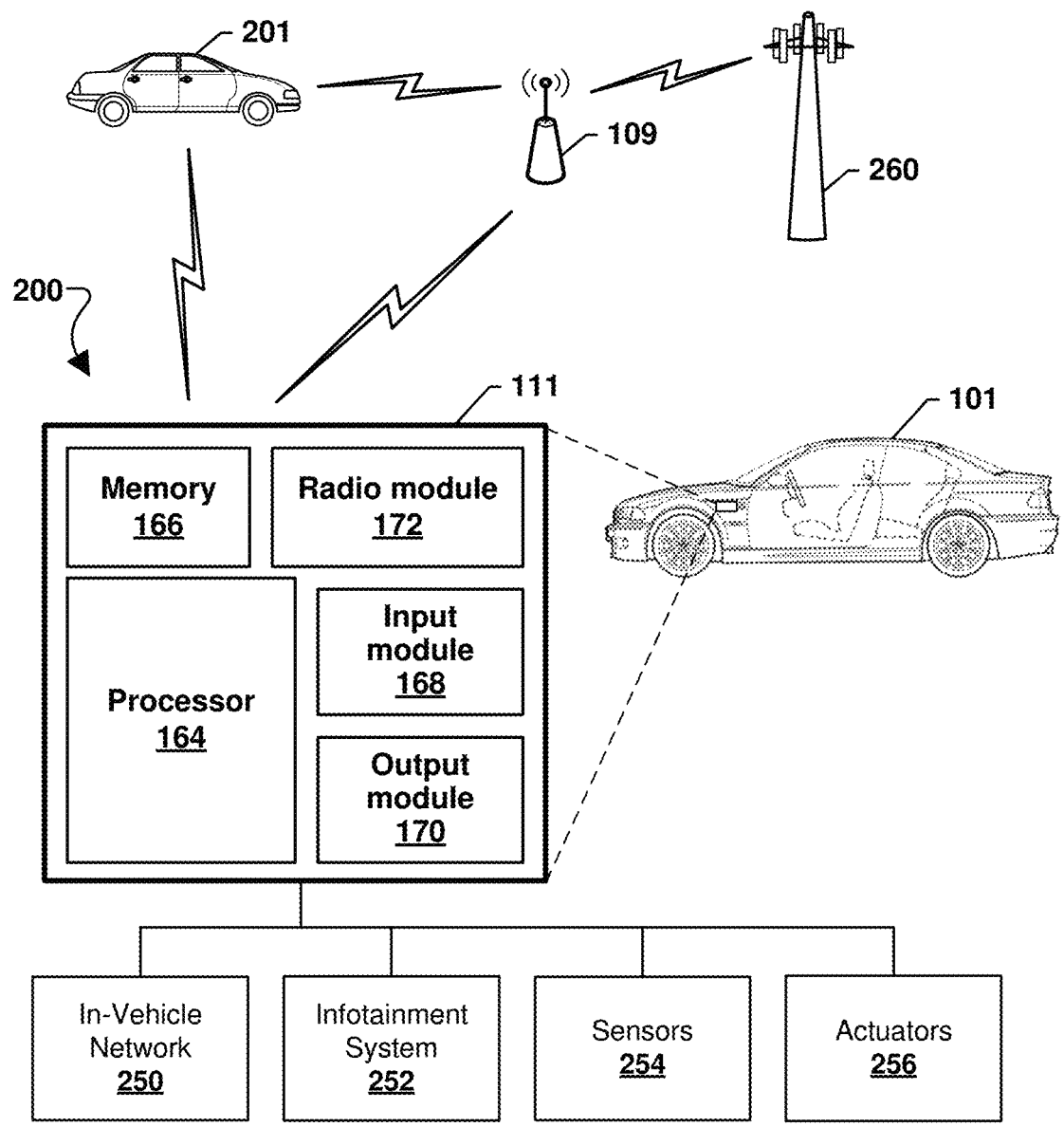
FIG. 2C is a component diagram of an example vehicle system suitable for implementing various embodiments.

FIG. 2C is a component diagram of an example vehicle system 200 suitable for implementing various embodiments. With reference to FIGS. 1-2C, the system 200 may include a vehicle 101 that includes onboard equipment 111 (for example, a telematics control unit or on-board unit (TCU/OBU). The onboard equipment 111 may communicate with various systems and devices, such as an in-vehicle network 250, an infotainment system 252, various sensors 254 (e.g., vehicle sensors and/or driver monitoring sensors), various actuators 256, and a radio frequency (RF) module 172. The onboard equipment 111 also may communicate with various other vehicles 201, roadside units 109, base stations 260, and other external devices. The onboard equipment 111 may be configured to perform operations for presenting relevant warnings to a vehicle operator as further described below.

In the example illustrated in FIG. 2C the onboard equipment 111 includes a processor 164, memory 166, an input module 168, an output module 170 and a radio module 172. The processor 164 that may be configured with processor-executable instructions to control determinations regarding alerts to a vehicle operator of relevant warnings, and optionally maneuvering, navigation, and/or other operations of the vehicle 101, including operations of various embodiments. The processor 164 may be coupled to the memory 166. Also, the processor 164 may be coupled to the output module 170, which may control in-vehicle displays for generating an alert regarding the V2X-identified threat on a determined display location.

The onboard equipment 111 may include a V2X antenna (e.g., an RF module 172), and may be configured to communicate with one or more Intelligent Transportation System (ITS) participants (e.g., stations) such as another vehicle 201, a roadside unit 109, and a base station 260 or another suitable network access point. In various embodiments, the onboard equipment 111 may receive information from a plurality of information sources, such as the in-vehicle network 250, infotainment system 252, various sensors 254 (e.g., driver monitoring sensors and/or other vehicle sensors), various actuators 256, and the RF module 172. The onboard equipment 111 may be configured to alert a vehicle operator of relevant warnings, as further described below.

Examples of an in-vehicle network 250 include a Controller Area Network (CAN), a Local Interconnect Network (LIN), a network using the FlexRay protocol, a Media Oriented Systems Transport (MOST) network, and an Automotive Ethernet network. Examples of vehicle sensors 254 include a location determining system (such as a Global Navigation Satellite Systems (GNSS) system, a camera, radar, lidar, ultrasonic sensors, infrared sensors, and other suitable sensor devices and systems. Examples of vehicle actuators 256 include various physical control systems such as for steering, brakes, engine operation, lights, directional signals, and the like.

Figure 3:
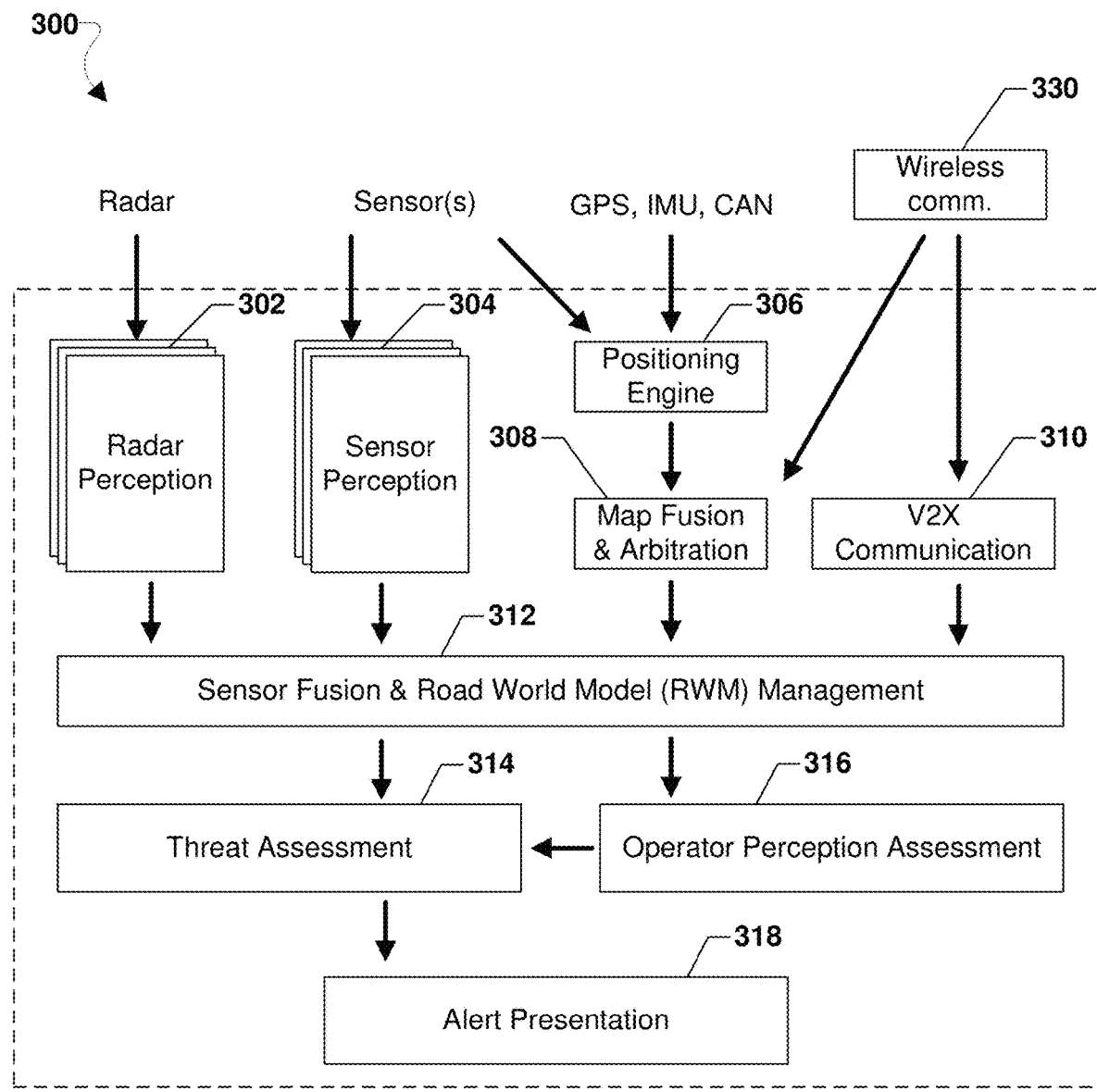
FIG. 3 is a component block diagram illustrating components of an example vehicle management system suitable for implementing various embodiments.

FIG. 3 is a component block diagram illustrating components of an example vehicle alert management system 300. The vehicle alert management system 300 may include various subsystems, communication elements, computational elements, computing devices or units which may be utilized within a vehicle 101. With reference to FIGS. 1-3, the various computational elements, computing devices or units within the vehicle alert management system 300 may be implemented within a system of interconnected computing devices (i.e., subsystems), that communicate data and commands to each other (e.g., indicated by the arrows in FIG. 3). In some implementations, the various computational elements, computing devices or units within vehicle alert management system 300 may be implemented within a single computing device, such as separate threads, processes, algorithms, or computational elements. Therefore, each subsystem/computational element illustrated in FIG. 3 is also generally referred to herein as "layer" within a computational "stack" that constitutes the vehicle alert management system 300. However, the use of the terms layer and stack in describing various embodiments are not intended to imply or require that the corresponding functionality is implemented within a single autonomous (or semi-autonomous) vehicle management system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The vehicle alert management system 300 may include a radar perception layer 302, a sensor perception layer 304, a positioning engine layer 306, a map fusion and arbitration layer 308, a V2X communications layer 310, sensor fusion and road world model (RWM) management layer 312, threat assessment layer 314, operator perception assessment layer 316, and the alert presentation layer 318. The layers 302-318 are merely examples of some layers in one example configuration of the vehicle alert management system 300. In other configurations, other layers may be included, such as additional layers for other perception sensors (e.g., LIDAR perception layer, etc.), additional layers for generating alerts and/or alert modality selection, additional layers for modeling, etc., and/or certain of the layers 302-318 may be excluded from the vehicle alert management system 300. Each of the layers 302-318 may exchange data, computational results and commands as illustrated by the arrows in FIG. 3. Further, the vehicle alert management system 300 may receive and process data from sensors (e.g., radar, lidar, cameras, inertial measurement units (IMU) etc.), navigation systems (e.g., Global Position System (GPS) receivers, IMUs, etc.), vehicle networks (e.g., Controller Area Network (CAN) bus), and databases in memory (e.g., digital map data). The vehicle alert management system 300 may output alerts and/or commands for generating alerts on a select in-vehicle alert modality. The configuration of the vehicle alert management system 300 illustrated in FIG. 3 is merely an example configuration and other configurations of a vehicle management system and other vehicle components may be used. As an example, the configuration of the vehicle alert management system 300 illustrated in FIG. 3 may be used in a vehicle configured for autonomous or semi-autonomous operation while a different configuration may be used in a non-autonomous vehicle.

The radar perception layer 302 may receive data from one or more detection and ranging sensors, such as radar (e.g., 132) and/or lidar (e.g., 138), and process the data to recognize and determine locations of other vehicles and objects within a vicinity of the vehicle 101. The radar perception layer 302 may include use of neural network processing and artificial intelligence methods to recognize objects and vehicles and pass such information on to the sensor fusion and RWM management layer 312.

The sensor perception layer 304 may receive data from one or more sensors, such as cameras (e.g., 122, 136) and other sensors (e.g., 211-238), and process the data to recognize and determine locations of other vehicles and objects within a vicinity of the vehicle 100, as well as observations regarding the driver (e.g., a direction of the operator's gaze). The sensor perception layer 304 may include use of neural network processing and artificial intelligence methods to recognize objects and vehicles and pass such information on to the sensor fusion and RWM management layer 312.

The positioning engine layer 306 may receive data from various sensors and process the data to determine a position of the vehicle 101. The various sensors may include, but are not limited to, a GPS sensor, an IMU, and/or other sensors connected via a CAN bus. The positioning engine layer 306 may also utilize inputs from one or more sensors, such as cameras (e.g., 122, 136) and/or any other available sensor, such as radars, LIDARs, etc.

The vehicle alert management system 300 may include or be coupled to a vehicle wireless communication subsystem 330. The wireless communication subsystem 330 may be configured to communicate with other vehicle computing devices and remote V2X communication systems, such as via V2X communications.

The map fusion and arbitration layer 308 may access sensor data received from other V2X system participants and receive output received from the positioning engine layer 306 and process the data to further determine the position of the vehicle 101 within the map, such as location within a lane of traffic, position within a street map, etc. sensor data may be stored in a memory (e.g., memory 166). For example, the map fusion and arbitration layer 308 may convert latitude and longitude information from GPS into locations within a surface map of roads contained in the sensor data. GPS position fixes include errors, so the map fusion and arbitration layer 308 may function to determine a best guess location of the vehicle within a roadway based upon an arbitration between the GPS coordinates and the sensor data. For example, while GPS coordinates may place the vehicle near the middle of a two-lane road in the sensor data, the map fusion and arbitration layer 308 may determine from the direction of travel that the vehicle is most likely aligned with the travel lane consistent with the direction of travel. The map fusion and arbitration layer 308 may pass map-based location information to the sensor fusion and RWM management layer 312.

The V2X communication layer 310 may receive and utilize sensor data and other inputs from the ITS to collect information about moving objects and conditions near and around the vehicle (e.g., 101). The V2X communications received by the V2X communication layer 310 may provide many types of information. For example, other vehicles or roadside units may provide camera images or sensor reading that may be analyzed (i.e., measuring proximity, motion, trajectory, etc.). The V2X communication layer 310 may pass V2X messaging information to the sensor fusion and RWM management layer 312. However, the use of V2X messaging information by other layers, such as the sensor fusion and RWM management layer 312, etc., is not required. For example, other stacks may control the vehicle (e.g., controlling one or more vehicle displays) without using received V2X messaging information.

In some embodiments, the processor may employ a machine learning process to initially determine, or to refine, detector settings for an ITS participant type. In some embodiments, the processor may provide a plurality of observations of parameters of an ITS participant type to a trained model, such as an ITS participant type model, and may receive as output from the model (e.g., the ITS participant type model) detector settings for one or more detectors that are configured to evaluate an aspect of an ITS participant.

In some embodiments, the processor may store the detector settings for each ITS participant type in a memory that is accessible by the vehicle computing device (for example, by an ITS participant type). In some embodiments, the processor may receive updates via a wireless network (e.g., V2X from a roadside unit (RSU), a 5G network, etc.) from a central source that distributes detector settings and setting updates to some or all ITS participants in a region. Such distributed detector settings or detector setting updates may be provided on the basis of ITS participant type.

Detector settings or detector setting updates may be distributed among ITS participants at any level of specificity or granularity, including one or more parameters of a single ITS participant type. For example, an ITS participant processor may receive and store an update indicating a car's maximum plausible speed. In this manner, the detector settings may be received, updated, and/or stored in a compartmentalized manner, for example, individually, and/or by ITS participant type. By enabling detector settings to be received, updated, and/or stored for as little as a single detector setting for an ITS participant type, the detector settings may be more robust against tampering or the introduction of false or spurious settings. For example, an update including a false setting for a car's maximum plausible speed may affect detections related to cars, but will not affect detections related to other ITS participant types (e.g., buses, motorcycles, pedestrians, etc.).

In some embodiments, the processor may determine whether information in the V2X message is plausible or implausible using the detector settings that are based on the ITS participant type. In some embodiments, the processor may determine whether a message is implausible based on whether information in the V2X message meets (e.g., is equal to or exceeds) a maximum or minimum plausible parameter for a detector. In some embodiments, the processor may determine whether a message is plausible or implausible based on the output of a number of detectors. In some embodiments, in response to determining that the information in the V2X message is implausible, the processor may perform a security action. For example, the processor may transmit a misbehavior report about the ITS participant to an ITS network element, such as a security server, or to a network element performing a similar or suitable function.

For ease of reference, some of the embodiments are described in this application with reference to a vehicle using V2X systems and protocols. However, it should be understood that various embodiments encompass any or all of the V2X or vehicle-based communication standards, messages, protocols, and/or technologies. As such, nothing in the application should be construed to limit the claims to a particular system (e.g., V2X) or message or messaging protocol (e.g., Basic Safety Message (BSM)) unless expressly recited as such in the claims. In addition, the embodiments described herein may refer to a V2X processing system in a vehicle. Other embodiments are contemplated in which the V2X processing system may operate in or be included in mobile devices, mobile computers, roadside units (RSUs), and other devices that are equipped to monitor road and vehicle conditions and to participate in V2X communications.

The sensor fusion and RWM management layer 312 may receive data and outputs produced by the radar perception layer 302, sensor perception layer 304, map fusion and arbitration layer 308, and V2X communication layer 310, and use some or all of such inputs to estimate or refine the location and state of the vehicle 101 in relation to the road, other vehicles on the road, and other objects or creatures within a vicinity of the vehicle 101.

For example, the sensor fusion and RWM management layer 312 may combine imagery data from the sensor perception layer 304 with arbitrated map location information from the map fusion and arbitration layer 308 to refine the determined position of the vehicle within a lane of traffic. As another example, the sensor fusion and RWM management layer 312 may combine object recognition and imagery data from the sensor perception layer 304 with object detection and ranging data from the radar perception layer 302 to determine and refine the relative position of other vehicles and objects in the vicinity of the vehicle. As another example, the sensor fusion and RWM management layer 312 may receive information from V2X communications (such as via the CAN bus or wireless communication subsystem 330) regarding other vehicle positions and directions of travel and combine that information with information from the radar perception layer 302 and the sensor perception layer 304 to refine the locations and motions of other objects.

The sensor fusion and RWM management layer 312 may compile for output situational information that provides details regarding the location and surroundings of the vehicle and its surroundings. Situational information may include refined location and state information of the vehicle 101, as well as refined location and state information of other vehicles and objects in the vicinity of the vehicle. Thus, the sensor fusion and RWM management layer 312 may output the situational information to the threat assessment layer 314 and/or the operator perception assessment layer 316.

As a further example, the sensor fusion and RWM management layer 312 may monitor perception data from various sensors, such as perception data from a radar perception layer 302, sensor perception layer 304, other perception layer, etc., and/or data from one or more sensors themselves to analyze conditions in the vehicle sensor data. The sensor fusion and RWM management layer 312 may be configured to detect conditions in the sensor data, such as sensor measurements being at, above, or below a threshold, certain types of sensor measurements occurring, etc., and may output the sensor data as part of the refined location and state information of the vehicle 101 provided to the operator perception assessment layer 316 and/or devices remote from the vehicle 100, such as a data server, other vehicles, etc., via wireless communications, such as through V2X connections, other wireless connections, etc.

The refined location and state information may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak brakes, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., network server 184); and/or owner/operator identification information.

The operator perception assessment layer 316 of the vehicle alert management system 300 may use the situational information output from the sensor fusion and RWM management layer 312 to predict future behaviors of other vehicles and/or objects. For example, the operator perception assessment layer 316 may use such situational information to predict future relative positions of other vehicles in the vicinity of the vehicle based on own vehicle position and velocity and other vehicle positions and velocity. Such predictions may consider information from the local dynamic map data and route planning to anticipate changes in relative vehicle positions as host and other vehicles follow the roadway. The operator perception assessment layer 316 may output other vehicle and object behavior and location predictions to the threat assessment layer 314. Additionally, the operator perception assessment layer 316 may use object behavior in combination with location predictions to plan and generate control signals for controlling the motion of the vehicle 101. For example, based on route planning information, refined location in the roadway information, and relative locations and motions of other vehicles, the operator perception assessment layer 316 may determine that the vehicle 101 needs to change lanes and accelerate/decelerate, such as to maintain or achieve minimum spacing from other vehicles, and/or prepare for a turn or exit. As a result, the operator perception assessment layer 316 may calculate or otherwise determine a steering angle for the wheels and a change to the throttle setting to be commanded to the threat assessment layer 314 and vehicle control unit 240 along with such various parameters necessary to effectuate such a lane change and acceleration and/or determine whether they were handled safely by the driver.

The threat assessment layer 314 may receive situational information, such as the data and information outputs from the sensor fusion and RWM management layer 312 and other vehicle and object behavior, as well as location predictions from the operator perception assessment layer 316 and use this information to determine whether the driver needs to be alerted. In addition, in response to determining that the driver needs to be alerted, the threat assessment layer 314 may receive driver state information from the sensor perception layer 304, via the sensor fusion and RWM management layer 312, as well as from the operator perception assessment layer 316. The threat assessment layer 314 may use the driver state information to determine an appropriate alert for the driver, as well as the one or more alert modalities that should be used for presenting the alert to the driver.

The threat assessment layer 314 may select one or more alert modalities based on a determined likelihood the driver will be more receptive to the chosen one or more alert modalities than other ones or combinations of the plurality of alert modalities. The likelihood of the driver being most receptive to the selected one or more alert modalities may be determined based on the received situational information, the received driver state information, and a historical behavior record of the driver. The historical behavior record of the driver may correlate the driver's reaction to a previous alert presented using one of the plurality of alert modalities with similar driver state information and similar situational information triggering the presentation of the previous alert.

Additionally, the determination of the likelihood that the driver will be receptive to the alert modality may be further based on feedback from reactions of other drivers in other vehicles to previously presented alerts under similar circumstances. For example, similar circumstances may include a close enough match of previous situational information that resembles the subject situational information without being identical. As a further example, similar circumstances may include a close enough match of previous other-driver state information that resembles the subject driver state information without being identical. The feedback from reactions of other drivers may be compiled by one or more computers (e.g., cloud-based storage), such as a remote server, a fleet operator control system, any one or more vehicle computers, or other computing device(s). The threat assessment layer 314 may receive the feedback from reactions of other drivers through the wireless communications 330 via the V2X communication layer 310 and the Sensor Fusion & RWM Management layer 312. In this way, feedback information about other driver reactions to one or more alert modalities under similar circumstances may be used to determine the likelihood that the subject driver will be receptive to the alert modality.

The threat assessment layer 314 may use the behavior of the driver to determine the driver's attention level, which may be divided into classes. Each class of behavior may have its own unique alert structure or set of preferred alert modalities. The driver's most recent behavior is preferably used, meaning the behavior within, for example, the latest 5-minute timeframe, since the driver's attention may fluctuate over time. The threat assessment layer 314 may be more accurate if it exclusively uses the most recent situational and driver state information. For example, receiving a call on a cell phone while driving is a common example of a reason a driver may shift their attention while driving. In this example, if the threat assessment layer 314 didn't use the most recent and up-to-date data, the threat assessment layer 314 might classify the driver's engagement level as more attentive than they are at that moment, which might negatively impact response time or situational awareness.

With the attention levels defined within the system, the threat assessment layer 314 may classify how attentive the driver is based on eye gaze, facial expressions, head orientation, posture, vocalizations, sounds, movement, interaction with a mobile phone or other peripheral computing device, performance in handling the vehicle (e.g., reaction time), as well as other conditions reflecting what is happening inside the vehicle. That classification level may then correspond to the system using the best alert structure for that driver (i.e., the appropriate alert for the selected one or more alert modalities). This level of customization may be safer than the current one-size-fits-all approach to alerting drivers.

The threat assessment layer 314 may determine a customized alert and select one or more alert modalities for each driver based on their personal preferences, driving scenario, internal factors, external factors, and severity of the situation. Internal and external factors may refer to activities happening in the vehicle's cabin and conditions happening on the road outside of the vehicle, respectively. In determining the customized alert and selecting the one or more alert modalities to use for presenting the customized alert, the threat assessment layer 314 may use a historical behavior record of the driver, which correlates the driver's reaction to a previous alert presented using one of the plurality of alert modalities with similar driver state information and similar situational information triggering the presentation of the previous alert.

The assessment as to whether situational information or driver state information entries of the historical behavior record or the feedback information about other driver reactions are "similar" to that of current situational information or driver state information, respectively, received by the vehicle computing device may be performed using one or more of various approaches. One way to determine whether conditions are similar is to compare the data that is being collected in the current situation with data collected in a previous situation. This could involve comparing numerical values, text, or other types of data. Another approach is to use machine learning algorithms to analyze the data and determine whether the conditions are similar. These algorithms can be trained on data from previous situations and can use various techniques, such as clustering or classification, to identify patterns and determine whether the current conditions are similar to those in a previous situation. In some cases, computers can use rules or heuristics to determine whether conditions are similar. For example, if a computer is trying to identify whether two situations are similar, it might use a rule that states that if two situations have the same characteristics, they are similar.

Characteristics of the driver, which may be measured by the sensor perception layer 304, may gather data such as head position, facial expression, and response time. This information may be used for the system to continuously learn what the driver's preferences are. Details in the facial expression, such as raising eyebrows, frowning, and changes in eye gaze can indicate that the user did not respond well to a particular alert and its alert modalities. This may then prompt the system to determine if the alert or the alert modalities may be altered to better suit the driver. Perhaps the driver was dissatisfied with how much information was provided or the alert modality that was used. The next alert and selected one or more alert modalities may be modified to get closer to the driver's "optimal" alert structure until it is eventually determined. The learning algorithm could potentially learn directly from the driver by surveying the driver once the vehicle is parked and the journey has been completed, or even during manual driving.

Driving scenarios may also impact the determination by the threat assessment layer 314 to alert the driver and which alert modalities to use. For example, the driver could be driving in a lane that is ending; this would require the driver to merge into a neighboring lane. There are many ways that the vehicle alert management system 300 may communicate the situation, risks, and desired driver feedback to the driver. In addition, there are many ways the driver may react to the sudden ending of the lane in which his/her vehicle is traveling. The scenario may prompt the user to feel nervous or anxious, the driver could brake harshly, or he/she could react nonchalantly. If the driver begins experiencing negative feelings or performing hazardous driving actions, then the system could adapt future alerts to improve the safety and experience for the driver. The driver's reaction to an alert may become associated with a particular scenario so that the threat assessment layer 314 knows how to mitigate problems in similar driving scenarios in the future.

Beyond what is happening outside of the vehicle, there may be scenarios of events happening inside the vehicle that can affect the performance of the driver. A common example of this is driving with noisy kids, pets, or music in the vehicle. In scenarios like this, the driver could miss an audible alert; however, the driver may have been more receptive to a visual/haptic combination. Therefore, conditions like cabin volume may be used by the threat assessment layer 314 to determine the most effective alert modality or combination of alert modalities to alert the driver.

Simple constraints may exist on the threat assessment layer 314. First, regardless of the user preference, there may always be at least two alert modalities deployed at any time. This constraint may exist because of the numerous studies that have concluded that multi-modal alerts have increased driver attention and reduced response times. Those outcomes may be the same ones the threat assessment layer 314 is trying to achieve. Secondly, the threat assessment layer 314 may tend to pick a more aggressive alert rather than a preferred alert in cases that are safety intensive.

Thus, in addition to pre-arranged settings that may be input by the driver, driver preferences may be determined over repeated observations of the driver using sensors that measure body language, response time, and even driver input (e.g., verbal confirmation from the driver). The threat assessment layer 314 may learn from the driver, using real-time data to determine the best suited alert modality for an alert that will satisfy the driver's preferences without compromising safety. Additionally, patterns learned by the threat assessment layer 314 may be collected and grouped by propagating across vehicle fleets; databases of user information may, for example, be used to find customization trends in different demographics of people by age, sex, race, vehicle type, and more.

In addition, the threat assessment layer may plan and monitor the motion of the vehicle 101 and verify that such vehicle movement meet safety requirements for the vehicle 101 before, during, and after alerts are presented to the driver.

In various embodiments, the wireless communication subsystem 330 may communicate with other V2X system participants via wireless communication links to transmit sensor data, position data, vehicle data and data gathered about the environment around the vehicle by onboard sensors. Such information may be used by other V2X system participants to update stored sensor data for relay to other V2X system participants.

In various embodiments, the vehicle threat management system 300 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the operator perception assessment layer 316 (or in a separate layer) may determine the current or future separate distance between another vehicle (as defined by the sensor fusion and RWM management layer 312) and the vehicle (e.g., based on the world model refined by the sensor fusion and RWM management layer 312), compare that separation distance to a safe separation distance parameter stored in memory, and pass along such information to the threat assessment layer 314.

In some embodiments, the operator perception assessment layer 316 may monitor and assess a driver's engagement level with regard to the operation of the vehicle before, during, and after the presentation of an alert. The driver's engagement level may include the driver's emotional state (e.g., as perceived from outward appearance and/or biometric data) and/or reaction to a presented alert using a select one or more alert modalities. For example, cameras images or video may be analyzed to detect the driver's reaction to an alert using a particular alert modality. Facial expressions, posture, and/or body movements may be used to characterize a driver's emotional state (e.g., smiling/laughing equals happy, frowning equals upset) to determine a driver's emotional state. Similarly, a microphone may be used to analyze audio to detect the driver's vocalizations, and vehicle navigational sensors configured to detect how the driver handles the vehicle in response to the alert.

The alert presentation layer 318 of the vehicle alert management system 300 may be configured to present one or more alerts to the driver using the selected one or more alert modalities determined by the threat assessment layer 314.

Figure 4A:
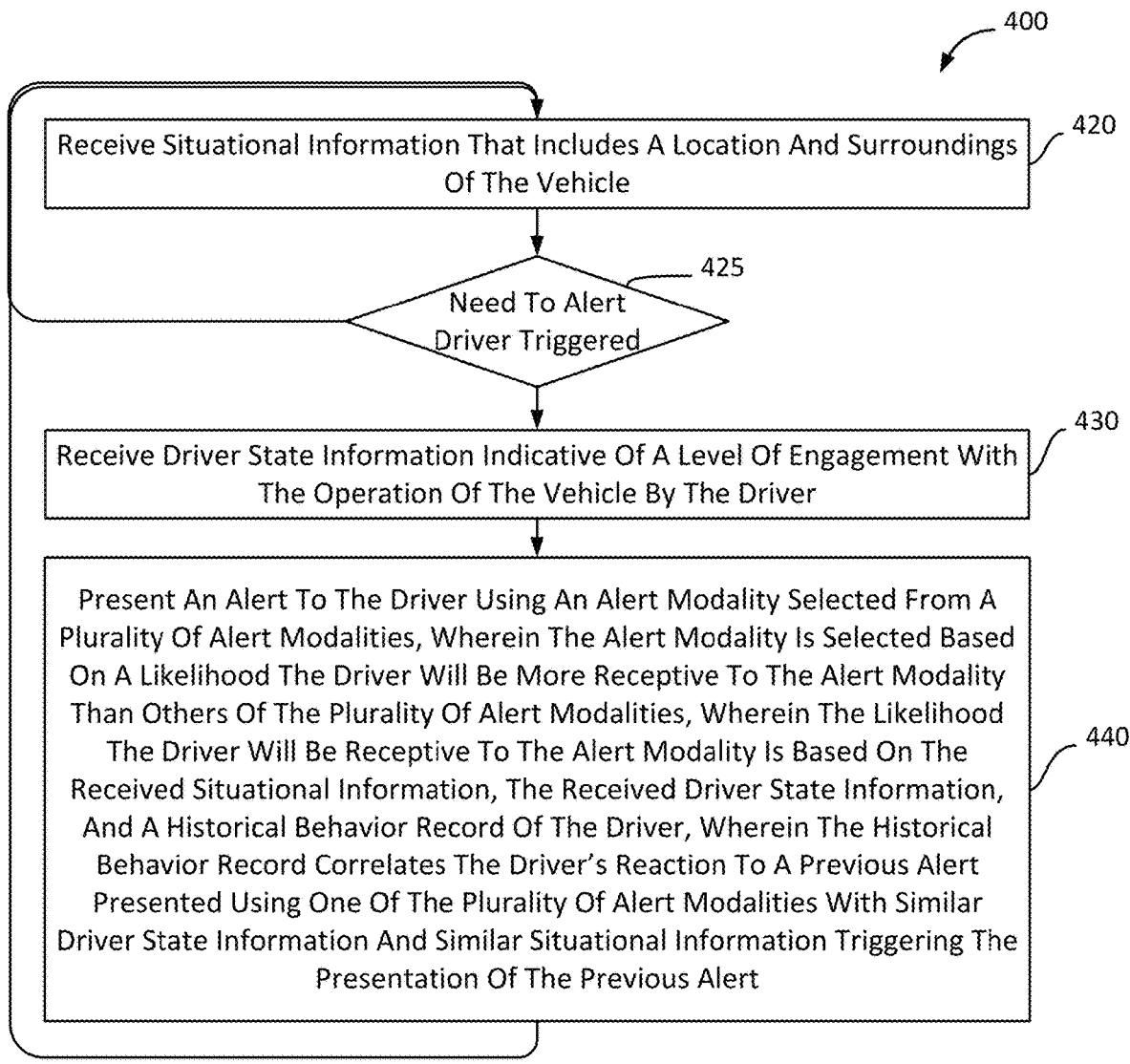
FIG. 4A is a process flow diagram of an example method for alerting a driver of a vehicle in accordance with various embodiments.

FIG. 4A is a process flow diagram of an example method 400 for selecting an alert modality for alerting a driver of a vehicle in accordance with various embodiments. With reference to FIGS. 1-4A, the operations of the method 400 may be performed by a processing system (e.g., 164, 240, 300) of onboard equipment (e.g., 111) of a vehicle (e.g., 101), the sensors (e.g., 211-238, 254), actuators (e.g., 256), the memory 166, the input module 168, the output module 170, the radio module 172, the radar perception layer 302, the sensor perception layer 304, the map fusion and arbitration layer 308, the V2X communication layer 310, the sensor fusion and RWM management layer 312, the threat assessment layer 314, the operator perception assessment layer 316, and the alert presentation layer 318.

In block 420, the vehicle computing device may receive situational information that includes the location and surroundings of the vehicle. The situational information provides details regarding the location and surroundings of the vehicle and its surroundings. Situational information may include refined location and state information of the vehicle (e.g., 101), as well as refined location and state information of other vehicles and objects in the vicinity of the vehicle. Situational information may include planned routing information (e.g., from an active navigation system) or information about circumstances that have developed in and/or around the vehicle. For example, in scenarios 1-4 described above, the situational information may include information about the roadway (e.g., 10), a future path plan for the vehicle (e.g., an upcoming exit/intersection), the approaching hazard (e.g., 20), the nearby warning sign (e.g., 25), other vehicles, elements, and/or objects nearby (e.g., 51-57, 61), and/or conditions inside the vehicle (e.g., noise level or movements therein).

Means for performing the operations of block 420 may include the vehicle computing device (e.g., 164, 240, 300) of onboard equipment (e.g., 111) of the vehicle (e.g., 101), the sensors (e.g., 211-238, 254), the actuators (e.g., 256), the memory 166, the input module 168, the radio module 172, the radar perception layer 302, the sensor perception layer 304, the map fusion and arbitration layer 308, the V2X communication layer 310, the sensor fusion and RWM management layer 312, the threat assessment layer 314, and the operator perception assessment layer 316.

In determination block 425, the vehicle computing device may determine whether the received situational information triggers the need to alert the driver. For example, in block 425, the vehicle computing device may determine whether circumstance warrant presenting the driver with an alert, particularly considering the current situational information. There are several ways that the vehicle computing device may make decisions based on multiple variables and adjustable thresholds. One approach is to use a set of rules that specify the conditions that must be met for the driver to be alerted.

For example, the vehicle computing device may have a rule that says, "if an autonomous vehicle decision has less than a 75% likelihood of meeting a navigational plan, then driver input is needed, thus warranting the driver being alerted." As another example, the vehicle computing device may have a rule that says, "if a threat to the vehicle or the vehicle occupants is more than 25% likely, then the driver should be alerted. The rule sets may also use more complex combinations of requirements before determining the driver needs to be alerted. Another approach is to use a machine learning algorithm to learn from data and make predictions or decisions based on that learning. For example, the vehicle computing device might be trained on data about the performance of different vehicles, creatures, and/or objects under different conditions, and then be able to predict which nearby vehicle, creature, and/or object is likely to cause a threat based on its current operating conditions. Regardless of the approach used, the conditions and thresholds used to make decisions may be defined in the system since such definitions may significantly impact the performance and accuracy of the system.

In response to the vehicle computing device in determination block 425 determining that the driver does not need to be alerted based on the received situational information (i.e., determination block 425="No"), the vehicle computing device may await receipt of additional situational information and once again proceed to block 420.

In response to the vehicle computing device in determination block 425 determining that the driver needs to be alerted based on the received situational information (i.e., determination block 425="Yes"), the vehicle computing device may receive, from driver monitoring sensors (e.g., in-vehicle sensors), driver state information indicative of a level of engagement with the operation of the vehicle by the driver in block 430.

As part of the operations in determination block 425, the vehicle computing device may evaluate a wide range of factors relevant to the risk posed to the vehicle and/or an occupant thereof when making a self-assessment of the V2X-identified threat. In some embodiments, in determination block 425 the vehicle computing device may evaluate an area classification for an area proximate to or in the general vicinity of the vehicle, such as conditions that could affect vehicle maneuverability, other vehicle/object/creature behavior, and location information of the vehicle (e.g., urban street, parking lot, suburban or sparser building presence, exurban, rural, etc.). In some embodiments, in determination block 425 the vehicle computing device may evaluate a roadway configuration of a roadway area proximate to the vehicle, such as conditions that may affect visibility, vehicle maneuvering, and vehicle behavior. For example, the vehicle computing device may evaluate the presence of an intersection, sidewalks, narrow roadways, straight vs. curved roadway, road terrain (e.g., hilly or flat), cross-walks, bike lane, and the like, which may affect the risk posed to the vehicle or occupants, as well as threats that the vehicle could pose to other vehicles, pedestrians, property, animals, etc. In some embodiments, in determination block 425 the vehicle computing device may determine historical risk information for an area proximate to the vehicle, such as whether the area has a history of accidents, types of accidents, and frequency of accidents.

In some embodiments, in determination block 425 the vehicle computing device may evaluate observed behavior of other vehicles, objects, or creatures, such as whether another vehicle is maneuvering erratically, traveling in the subject vehicle's travel lane or on or near the road, traveling on a sidewalk or in a bike lane. In some embodiments, in determination block 425 the vehicle computing device may classify other vehicles, objects, and/or creatures, such as whether the other vehicles, objects, and/or creatures is a car, truck, cyclist, pedestrian, animal, etc.

In some embodiments, in determination block 425 the vehicle computing device may evaluate local weather conditions, such as conditions that may affect visibility, maneuverability, and vehicle handling, including the presence of fog, rain, ice, wet or slippery roads, and the like, as well as sunlight or lighting conditions such as dawn or twilight, night-time, daylight, the presence or absence of street lighting at night, and the like.

Means for performing the operations of determination block 425 may include the vehicle computing device (e.g., 164, 240, 300) of onboard equipment (e.g., 111) of the vehicle (e.g., 101), the memory 166, the radio module 172, the radar perception layer 302, the sensor perception layer 304, the map fusion and arbitration layer 308, the V2X communication layer 310, the sensor fusion and RWM management layer 312, the threat assessment layer 314, and the operator perception assessment layer 316.

In block 430, the vehicle computing device may receive, from driver monitoring sensors (e.g., in-vehicle sensors), driver state information indicative of a level of engagement with the operation of the vehicle by the driver. The driver state information received in block 430 may indicate whether the driver is paying attention to the operation of the vehicle, such as when the driver is actively driving and looking ahead. The driver state information may additionally include information that suggests a particular emotional state of the driver that is measurable using in-vehicle sensors. For example, if an in-vehicle camera may be configured to monitor and capture facial expressions of the driver, which computer vision of the vehicle computing device analyzes, the result may show that the driver is happy (e.g., smiling), angry or sad (e.g., frowning), upset (e.g., crying), not feeling well (e.g., watery eyes), daydreaming (e.g., eyes not focused), and the like.

Means for performing the operations of block 430 may include the vehicle computing device (e.g., 164, 240, 300) of onboard equipment (e.g., 111) of the vehicle (e.g., 101), the sensors (e.g., 211-238, 254), the actuators (e.g., 256), the memory 166, the input module 168, the radio module 172, the sensor perception layer 304, the sensor fusion and RWM management layer 312, and the operator perception assessment layer 316.

In block 440, the vehicle computing device may present an alert to the driver using an alert modality selected from a plurality of alert modalities. The alert modality may be selected based on a determined likelihood the driver will be more receptive to the alert modality than others of the plurality of alert modalities. The likelihood the driver will be receptive to the alert modality may be based on the received situational information, the received driver state information, and a historical behavior record of the driver. The historical behavior record may correlate the driver's reaction to a previous alert presented using one of the plurality of alert modalities with similar driver state information and similar situational information triggering the presentation of the previous alert. The likelihood that the driver will be receptive to the alert modality may be determined based on feedback from reactions of other drivers to at least one of similar situational information or similar other-driver state information.

For example, in scenario 1 described above, the historical behavior record indicated that under similar circumstances the previous alert modality that was used had a mixed response from the driver, but still had the highest probability of receiving a positive reaction from the driver, and thus the previous alert modality, which happened to be the default combination of visual and audible alert modalities, was presented by the vehicle computing device. In scenario 2 described above, the historical behavior record indicated that under similar circumstances the used previously alert modalities elicited a negative reaction from the driver, and thus the processor used a different set of alert modalities, namely a combination of visual and haptic alerts. In scenario 3 described above, the historical behavior record indicated that under similar circumstances the alert modalities used previously used elicited a positive reaction from the driver, and thus the processor used the same set of alert modalities, namely a combination of haptic and audible alerts. Similarly in scenario 4 described above, the historical behavior record indicated that under similar circumstances the alert modality used previously elicited a positive reaction from the driver, and thus the processor used the same alert modality, namely an audible alert.

Means for performing the operations of block 440 may include the vehicle computing device (e.g., 164, 240, 300) of onboard equipment (e.g., 111) of the vehicle (e.g., 101), actuators (e.g., 256), the memory 166, the output module 170, the radio module 172, the V2X communication layer 310, and the alert presentation layer 318.

Figure 4B:
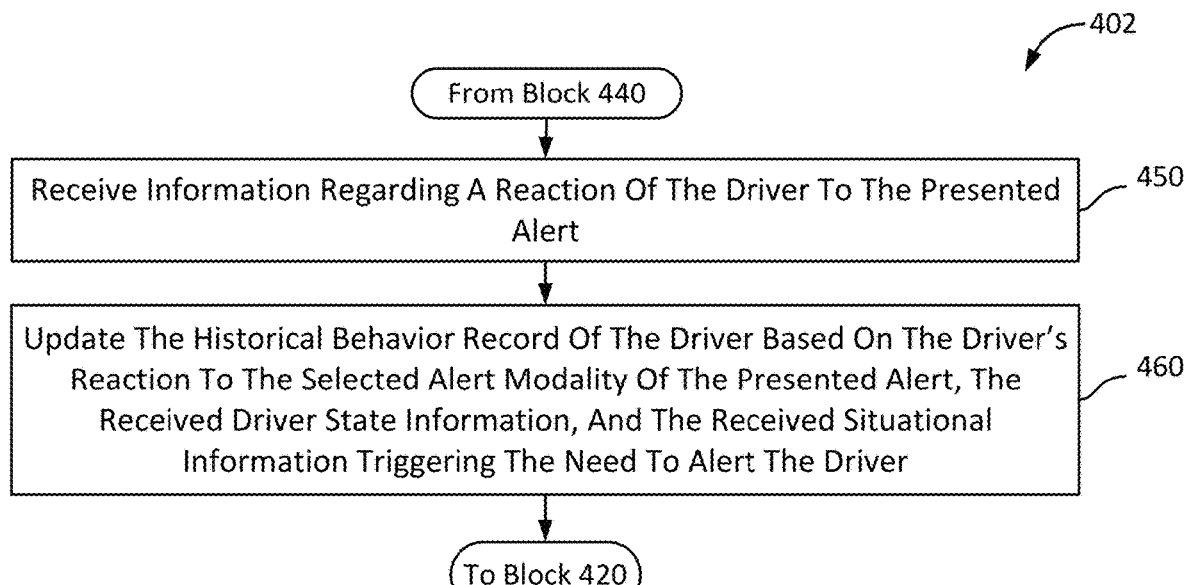
FIGS. 4B and 4C are process flow diagrams of example operations that may be performed as part of the method for alerting a driver of a vehicle in accordance with various embodiments.

FIG. 4B is a process flow diagram of example operations 402 that may be performed as part of the method 400 for alerting a driver of a vehicle in accordance with various embodiments. With reference to FIGS. 1-4B, the operations 420, 425, 430, 440, 450, and 460 may be performed by a processing system (e.g., 164, 240, 300) of onboard equipment (e.g., 111) of a vehicle (e.g., 101), the sensors (e.g., 211-238, 254), actuators (e.g., 256), the memory 166, the input module 168, the output module 170, the radio module 172, the radar perception layer 302, the sensor perception layer 304, the map fusion and arbitration layer 308, the V2X communication layer 310, the sensor fusion and RWM management layer 312, the threat assessment layer 314, the operator perception assessment layer 316, and the alert presentation layer 318.

With reference to FIGS. 1-4B, after presenting the alert to the driver using the alert modality selected from a plurality of alert modalities in block 440 of the method 400, the vehicle computing device may receive, from driver monitoring sensors, information regarding a reaction of the driver to the presented alert in block 450. For example, the vehicle computing device may receive an indication of a positive response (e.g., smiling), a neutral response (e.g., no reaction by the driver), or negative response (e.g., frowning, angry, startled, agitated, etc.).

Means for performing the operations of block 450 may include the vehicle computing device (e.g., 164, 240, 300) of onboard equipment (e.g., 111) of the vehicle (e.g., 101), the sensors (e.g., 211-238, 254), the actuators (e.g., 256), the memory 166, the input module 168, the radio module 172, the radar perception layer 302, the sensor perception layer 304, the map fusion and arbitration layer 308, the V2X communication layer 310, the sensor fusion and RWM management layer 312, the threat assessment layer 314, and the operator perception assessment layer 316.

In block 460, the vehicle computing device may update the historical behavior record of the driver based on the driver's reaction to the selected alert modality of the presented alert, the received driver state information, and the received situational information triggering the need to alert the driver. For example, the update to the historical behavior record may reflect whether the driver reacted in a positive, neutral, or negative way, which update may adjust a weighting that is used to determine which one or more alert modalities to use next time when similar circumstances arise and alert modalities need to be selected. Alternatively, rather than just three types of response (e.g., positive, neutral, or negative) a more nuanced or numeric value may be attributed to the driver's reaction, which may be reflected in the weighting.

Means for performing the operations of block 460 may include the vehicle computing device (e.g., 164, 240, 300) of onboard equipment (e.g., 111) of a vehicle (e.g., 101), the memory 166, the output module 170, the radio module 172, and the threat assessment layer 314. Following the operations in block 460, the vehicle computing device may perform the operations in block 420 of the method 400 as described.

Figure 4C:
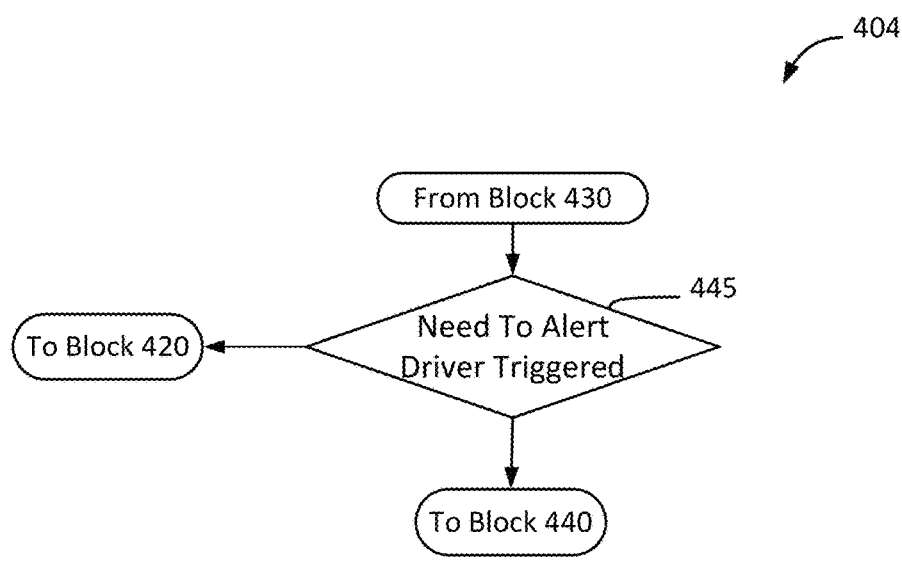

FIG. 4C is a process flow diagram of example operations 404 that may be performed as part of the method 400 for alerting a driver of a vehicle in accordance with various embodiments. With reference to FIGS. 1-4C, the operations 420, 425, 430, 440, and 445 may be performed by a processing system (e.g., 164, 240, 300) of onboard equipment (e.g., 111) of a vehicle (e.g., 101), the sensors (e.g., 211-238, 254), actuators (e.g., 256), the memory 166, the input module 168, the output module 170, the radio module 172, the radar perception layer 302, the sensor perception layer 304, the map fusion and arbitration layer 308, the V2X communication layer 310, the sensor fusion and RWM management layer 312, the threat assessment layer 314, the operator perception assessment layer 316, and the alert presentation layer 318.

With reference to FIGS. 1-4B, after receiving the driver state information in block 430 of the method 400, the vehicle computing device may once again determine whether the received driver state information triggers the need to alert the driver in determination block 445. In this way, before presenting an alert to the driver, the vehicle computing device assesses both the situational information (i.e., in determination block 425) and the driver state information (i.e., in determination block 445). For example, in block 445, the vehicle computing device may determine whether circumstance warrant presenting the driver with an alert, particularly considering the current driver state information. There are several ways that the vehicle computing device may make decisions based on multiple variables and adjustable thresholds, as described above with regard to determination block 425. For example, in addition to a threat to the vehicle or occupants meeting a threshold, rules engine may further require that the driver state information suggest the driver is unaware of the threat.

In some embodiments, in determination block 445 the vehicle computing device may evaluate observed behavior of the driver and/or other occupants of the vehicle, such as whether the driver is asleep or distracted, whether a passenger is acting aggressively or otherwise distracting the driver, or other conditions within the vehicle.

Means for performing the operations of determination block 445 may include the vehicle computing device (e.g., 164, 240, 300) of onboard equipment (e.g., 111) of the vehicle (e.g., 101), the memory 166, the radio module 172, the radar perception layer 302, the sensor perception layer 304, the map fusion and arbitration layer 308, the V2X communication layer 310, the sensor fusion and RWM management layer 312, the threat assessment layer 314, and the operator perception assessment layer 316.

In response to the vehicle computing device in determination block 445 determining that the driver does not need to be alerted based on the received driver state information (i.e., determination block 445="No"), the vehicle computing device may await receipt of additional situational information and once again proceed to block 420 of the method 400 as described.

In response to the vehicle computing device in determination block 445 determining that the driver needs to be alerted based on the received driver state information (i.e., determination block 445="Yes"), the vehicle computing device may present an alert to the driver using an alert modality selected from a plurality of alert modalities in block 440 of the method 400 as described.

It should be understood that any references to terminology and/or technical details related to an individual telecommunication standard or technology are for illustrative purposes only and are not intended to limit the scope of the claims to a particular communication system or technology unless specifically recited in the claim language.

Implementation examples are described in the following paragraphs. While some of the following implementation examples are described in terms of example methods, further example implementations may include: the example methods discussed in the following paragraphs implemented by a processing system of onboard equipment including a processor configured with processor-executable instructions to perform operations of the methods of the following implementation examples; the example methods discussed in the following paragraphs implemented by a processing system of onboard equipment including means for performing functions of the methods of the following implementation examples; and the example methods discussed in the following paragraphs may be implemented as a non-transitory processor-readable storage medium having stored thereon processor-executable instructions configured to cause a by a processing system of onboard equipment to perform the operations of the methods of the following implementation examples.

Example 1. A method performed by a processor of a vehicle for selecting an alert modality for alerting a driver of a vehicle, the method including: receiving, by a processor of the vehicle, situational information triggering a need to alert the driver, in which the situational information includes a location and surroundings of the vehicle; and in response to the need to alert the driver based on the received situational information: receiving, by the processor from driver monitoring sensors, driver state information indicative of a level of engagement with the operation of the vehicle by the driver; and presenting an alert to the driver using an alert modality selected from a plurality of alert modalities, in which the alert modality is selected based on a likelihood the driver will be more receptive to the alert modality than others of the plurality of alert modalities, in which the likelihood the driver will be receptive to the alert modality is based on the received situational information, the received driver state information, and a historical behavior record of the driver, in which the historical behavior record correlates the driver's reaction to a previous alert presented using one of the plurality of alert modalities with similar driver state information and similar situational information triggering presentation of the previous alert.

Example 2. The method of example 1, further including: receiving, by the processor from the driver monitoring sensors, information regarding a reaction of the driver to the presented alert; and updating the historical behavior record of the driver based on the driver's reaction to the selected alert modality of the presented alert, the received driver state information, and the received situational information triggering the need to alert the driver.

Example 3. The method of example 2, in which the information regarding the reaction of the driver to the presented alert includes a facial expression of the driver obtained when or just after the alert is presented.

Example 4. The method of example 2, in which the information regarding the reaction of the driver to the presented alert includes a response time of the driver reacting to the presented alert.

Example 5. The method of example 2, in which the information regarding the reaction of the driver to the presented alert includes information evaluating whether the driver operated the vehicle within acceptable parameters.

Example 6. The method of any of examples 1-5, in which the historical behavior record correlates the driver's reaction to the previous alert as one in which the driver exhibited a negative emotional state in response to the alert modality used for the previous alert.

Example 7. The method of any of examples 1-6, in which the historical behavior record correlates the driver's reaction to the previous alert as one in which the driver operating the vehicle outside acceptable parameters in response to the alert modality of the previous alert.

Example 8. The method of any of examples 1-7, in which the selected alert modality used for the presented alert over-rides a user preference of alert modalities.

Example 9. The method of any of examples 1-8, in which the likelihood the driver will be receptive to the alert modality is further based on feedback from reactions of other drivers to at least one of similar situational information or similar other-driver state information.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for selecting an alert modality for alerting a driver of a vehicle, the method comprising:
    receiving, by a processor of the vehicle, situational information triggering a need to alert the driver, wherein the situational information includes a location and surroundings of the vehicle; and
    in response to the need to alert the driver based on the received situational information:
        receiving, by the processor from driver monitoring sensors, driver state information indicative of a level of engagement with the operation of the vehicle by the driver; and presenting an alert to the driver using an alert modality selected from a plurality of alert modalities, wherein the alert modality is selected based on the driver's reaction to a previous alert, which is used to determine a likelihood that the driver will be more receptive to the alert modality than others of the plurality of alert modalities, wherein the likelihood the driver will be receptive to the alert modality is also based on the received situational information, the received driver state information, and a historical behavior record of the driver, wherein the historical behavior record correlates the driver's reaction to the previous alert presented using one of the plurality of alert modalities with similar driver state information and similar situational information triggering presentation of the previous alert.

2. The method of claim 1, further comprising:
receiving, by the processor from the driver monitoring sensors, information regarding a reaction of the driver to the presented alert; and
updating the historical behavior record of the driver based on the driver's reaction to the selected alert modality of the presented alert, the received driver state information, and the received situational information triggering the need to alert the driver.

3. The method of claim 2, wherein the information regarding the reaction of the driver to the presented alert includes a facial expression of the driver obtained when or just after the alert is presented.

4. The method of claim 2, wherein the information regarding the reaction of the driver to the presented alert includes a response time of the driver reacting to the presented alert.

5. The method of claim 2, wherein the information regarding the reaction of the driver to the presented alert includes information evaluating whether the driver operated the vehicle within acceptable parameters.

6. The method of claim 1, wherein the historical behavior record correlates the driver's reaction to the previous alert as one in which the driver exhibited a negative emotional state in response to the alert modality used for the previous alert.

7. The method of claim 1, wherein the historical behavior record correlates the driver's reaction to the previous alert as one in which the driver operating the vehicle outside acceptable parameters in response to the alert modality of the previous alert.

8. The method of claim 1, wherein the selected alert modality used for the presented alert over-rides a user preference of alert modalities.

9. The method of claim 1, wherein the likelihood the driver will be receptive to the alert modality is further based on feedback from reactions of other drivers to at least one of similar situational information or similar other-driver state information.

10. A vehicle, comprising:
a plurality of sensors including vehicle sensors and driver monitoring sensors; and
a processor of the vehicle coupled to the plurality of sensors and configured to:
receive, from the vehicle sensors, situational information triggering a need to alert a driver of the vehicle, wherein the situational information includes a location and surroundings of the vehicle; and
in response to the need to alert the driver based on the received situational information:
receive, from the driver monitoring sensors, driver state information indicative of a level of engagement with the operation of the vehicle by the driver; and
present an alert to the driver using an alert modality selected from a plurality of alert modalities, wherein the alert modality is selected based on the driver's reaction to a previous alert, which is used to determine a likelihood that the driver will be more receptive to the alert modality than others of the plurality of alert modalities, wherein the likelihood the driver will be receptive to the alert modality is also based on the received situational information, the received driver state information, and a historical behavior record of the driver, wherein the historical behavior record correlates the driver's reaction to the previous alert presented using one of the plurality of alert modalities with similar driver state information and similar situational information triggering presentation of the previous alert.

11. The vehicle of claim 10, wherein the processor is further configured to:
receive, from the driver monitoring sensors, information regarding a reaction of the driver to the presented alert; and
update the historical behavior record of the driver based on the driver's reaction to the selected alert modality of the presented alert, the received driver state information, and the received situational information triggering the need to alert the driver.

12. The vehicle of claim 11, wherein the information regarding the reaction of the driver to the presented alert includes a facial expression of the driver obtained when or just after the alert is presented.

13. The vehicle of claim 11, wherein the information regarding the reaction of the driver to the presented alert includes a response time of the driver reacting to the presented alert.

14. The vehicle of claim 11, wherein the information regarding the reaction of the driver to the presented alert includes information evaluating whether the driver operated the vehicle within acceptable parameters.

15. The vehicle of claim 10, wherein the historical behavior record correlates the driver's reaction to the previous alert as one in which the driver exhibited a negative emotional state in response to the alert modality used for the previous alert.

16. The vehicle of claim 10, wherein the historical behavior record correlates the driver's reaction to the previous alert as one in which the driver operating the vehicle outside acceptable parameters in response to the alert modality of the previous alert.

17. The vehicle of claim 10, wherein the processor is configured such that the selected alert modality used for the presented alert over-rides a user preference of alert modalities.

18. The vehicle of claim 10, wherein the processor is configured to determine the likelihood the driver will be receptive to the alert modality further based on feedback from reactions of other drivers to at least one of similar situational information or similar other-driver state information.

19. A computing device for use in a vehicle, comprising:
a sensor interface for receiving data from a plurality of sensors including vehicle sensors and driver monitoring sensors; and a processor coupled to the sensor interface and configured to:
  receive, from vehicle sensors, situational information triggering a need to alert a driver of the vehicle, wherein the situational information includes a location and surroundings of the vehicle; and
  in response to the need to alert the driver based on the received situational information:
    receive, from the driver monitoring sensors, driver state information indicative of a level of engagement with the operation of the vehicle by the driver; and
    present an alert to the driver using an alert modality selected from a plurality of alert modalities, wherein the alert modality is selected based on the driver's reaction to a previous alert, which is used to determine a likelihood that the driver will be more receptive to the alert modality than others of the plurality of alert modalities, wherein the likelihood the driver will be receptive to the alert modality is also based on the received situational information, the received driver state information, and a historical behavior record of the driver, wherein the historical behavior record correlates the driver's reaction to the previous alert presented using one of the plurality of alert modalities with similar driver state information and similar situational information triggering presentation of the previous alert.

20. The computing device of claim 19, wherein the processor is further configured to:
  receive, from the driver monitoring sensors, information regarding a reaction of the driver to the presented alert; and
  update the historical behavior record of the driver based on the driver's reaction to the selected alert modality of the presented alert, the received driver state information, and the received situational information triggering the need to alert the driver.

21. The computing device of claim 20, wherein the information regarding the reaction of the driver to the presented alert includes a facial expression of the driver obtained when or just after the alert is presented.

22. The computing device of claim 20, wherein the information regarding the reaction of the driver to the presented alert includes a response time of the driver reacting to the presented alert.

23. The computing device of claim 20, wherein the information regarding the reaction of the driver to the presented alert includes information evaluating whether the driver operated the vehicle within acceptable parameters.

24. The computing device of claim 19, wherein the historical behavior record correlates the driver's reaction to the previous alert as one in which the driver exhibited a negative emotional state in response to the alert modality used for the previous alert.

25. The computing device of claim 19, wherein the historical behavior record correlates the driver's reaction to the previous alert as one in which the driver operating the vehicle outside acceptable parameters in response to the alert modality of the previous alert.

26. The computing device of claim 19, wherein the processor is configured such that the selected alert modality used for the presented alert over-rides a user preference of alert modalities.

27. The computing device of claim 19, wherein the processor is configured to determine the likelihood the driver will be receptive to the alert modality further based on feedback from reactions of other drivers to at least one of similar situational information or similar other-driver state information.

28. A non-transitory processor-readable storage medium having stored thereon processor-executable instructions configured to cause a processor of a vehicle to perform operations comprising:
  receiving situational information triggering a need to alert a driver of the vehicle, wherein the situational information includes a location and surroundings of the vehicle; and
  in response to the need to alert the driver based on the received situational information:
    receiving, from driver monitoring sensors, driver state information indicative of a level of engagement with the operation of the vehicle by the driver; and
    presenting an alert to the driver using an alert modality selected from a plurality of alert modalities, wherein the alert modality is selected based on the driver's reaction to a previous alert, which is used to determine a likelihood that the driver will be more receptive to the alert modality than others of the plurality of alert modalities, wherein the likelihood the driver will be receptive to the alert modality is also based on the received situational information, the received driver state information, and a historical behavior record of the driver, wherein the historical behavior record correlates the driver's reaction to the previous alert presented using one of the plurality of alert modalities with similar driver state information and similar situational information triggering presentation of the previous alert.

29. The non-transitory processor-readable storage medium of claim 28, wherein the processor-executable instructions are further configured to cause the processor of the vehicle to perform operations comprising:
  receiving, from the driver monitoring sensors, information regarding a reaction of the driver to the presented alert; and
  updating the historical behavior record of the driver based on the driver's reaction to the selected alert modality of the presented alert, the received driver state information, and the received situational information triggering the need to alert the driver.

30. The non-transitory processor-readable storage medium of claim 29, wherein the processor-executable instructions are configured such that the information regarding the reaction of the driver to the presented alert includes at least one of a facial expression of the driver obtained when or just after the alert is presented, a response time of the driver reacting to the presented alert, or information evaluating whether the driver operated the vehicle within acceptable parameters.

* * * * *